(12) United States Patent
Lang et al.

(10) Patent No.: US 7,143,710 B2
(45) Date of Patent: Dec. 5, 2006

(54) LOW DRAG SHIP HULL

(76) Inventors: Thomas G. Lang, 417 Loma Larga Dr., Solona Beach, CA (US) 92075; James T. Lang, 559 Homer Ave., Palo Alto, CA (US) 94301

( * ) Notice: Subject to any disclaimer, the term of this patent is extended or adjusted under 35 U.S.C. 154(b) by 0 days.

(21) Appl. No.: 10/732,512

(22) Filed: Dec. 11, 2003

(65) Prior Publication Data
US 2005/0126464 A1    Jun. 16, 2005

(51) Int. Cl.
B63B 1/24 (2006.01)
(52) U.S. Cl. .................. 114/278; 114/61.12; 114/272; 114/282
(58) Field of Classification Search ............. 114/61.1, 114/61.2, 61.27, 61.29, 61.32, 274, 288, 289, 114/272, 278, 282, 61.12
See application file for complete search history.

(56) References Cited

U.S. PATENT DOCUMENTS

| | | | |
|---|---|---|---|
| 1,003,364 A | 9/1911 | Langston | |
| 1,121,006 A | 12/1914 | Fauber | |
| 1,389,865 A | 9/1921 | Fox | |
| 1,656,411 A | 1/1928 | Baldwin | |
| 2,906,228 A | 9/1959 | Wendel | |
| 2,914,014 A | 11/1959 | Carl et al. | |
| 3,016,865 A | 1/1962 | Eichenberger | |
| 3,041,992 A | 7/1962 | Lee | |
| 3,044,432 A | 7/1962 | Wennagel et al. | |
| 3,065,723 A | 11/1962 | Tulin | |
| 3,075,489 A | 1/1963 | Eichenberger | |
| 3,077,173 A | 2/1963 | Lang | |
| 3,109,495 A | 11/1963 | Lang | |
| 3,117,546 A | 1/1964 | von Schertel | |
| 3,146,751 A | 9/1964 | von Schertel | |
| 3,195,495 A | 7/1965 | Erlandsen | |
| 3,199,484 A | 8/1965 | Wiberg | |
| 3,203,389 A | 8/1965 | Cale | |
| 3,205,846 A | 9/1965 | Lang | |
| 3,213,818 A | 10/1965 | Barkley | |

(Continued)

FOREIGN PATENT DOCUMENTS

FR     FR 1421624     11/1964

OTHER PUBLICATIONS

A. Poustoshny; *State of the Art ib Investigation on Artificial-cavity Ships*; Project Report, Krylov Shipbuilding Research Institute, Ship Hydrodynamics Division; St. Petersburg, Russia; Feb. 2000.

*Primary Examiner*—Stephen Avila
(74) *Attorney, Agent, or Firm*—James Creighton Wray

(57) ABSTRACT

A low drag ship hull generally includes a side air cavity initiated by wetted bow section, bottom air cavity initiated by wetted bottom nosepiece, wetted stem section that closes a lower portion of the side cavity, wetted bottom tailpiece that closes the bottom cavity, stabilizing fin, and propulsor. The bottom of a catamaran hull cross structure includes bow impact alleviator. Optional flaps in the stabilizing fins, together with optional all-movable canard fins are used for control. Different wetted bow sections and retractable plates are used for starting side cavities. A low drag hull may utilize multiple air cavities. A new low drag hull includes a new upper bottom air cavity that is initiated by an upper bottom wetted nosepiece, and closed by an upper bottom tailpiece. Alternative designs include a shortened forward hull spaced ahead of a shortened aft hull, and a hydrofoil-supported trimaran with low drag hulls.

307 Claims, 13 Drawing Sheets

U.S. PATENT DOCUMENTS

| | | |
|---|---|---|
| 3,342,155 A | 9/1967 | Hook |
| 3,364,892 A | 1/1968 | Persson et al. |
| 3,467,043 A | 9/1969 | Bowles |
| 3,504,649 A | 4/1970 | Scherer |
| 3,688,723 A | 9/1972 | Ulvesand et al. |
| 4,117,995 A | 10/1978 | Runge |
| 4,165,703 A | 8/1979 | Burg |
| 4,231,314 A | 11/1980 | Peters |
| 4,706,910 A | 11/1987 | Walsh et al. |
| 4,708,085 A | 11/1987 | Blee |
| 4,865,271 A | 9/1989 | Savill |
| 5,025,745 A | 6/1991 | Wine |
| 5,133,516 A | 7/1992 | Marentic et al. |
| 5,176,095 A | 1/1993 | Burg |
| 5,273,238 A | 12/1993 | Sato |
| 5,390,624 A | 2/1995 | Barnes |
| 5,415,120 A | 5/1995 | Burg |
| 5,456,201 A | 10/1995 | Bobst |
| 5,570,650 A | 11/1996 | Harley |
| 5,601,047 A | 2/1997 | Shen |
| 5,787,829 A | 8/1998 | Oshima |
| 5,967,071 A | 10/1999 | Wipper |
| 6,167,829 B1 | 1/2001 | Lang |
| 6,345,791 B1 | 2/2002 | McClure |
| 6,439,148 B1 | 8/2002 | Lang |

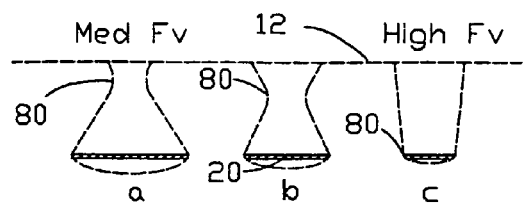
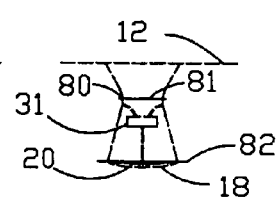
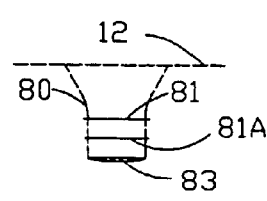
Fig. 8A    Fig. 8B    Fig. 8C
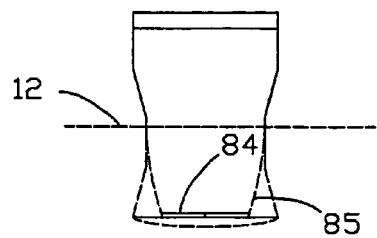
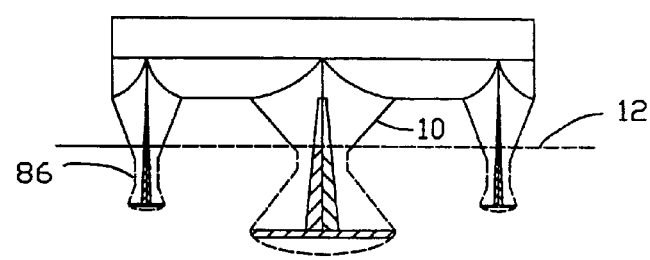
Fig. 9A    Fig. 9B
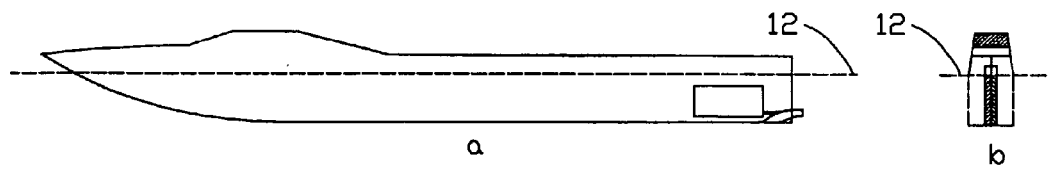
Fig. 9C
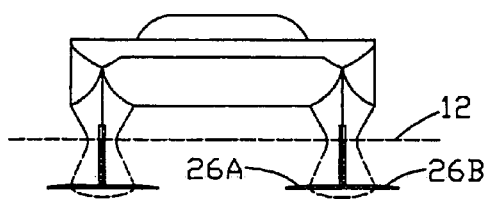
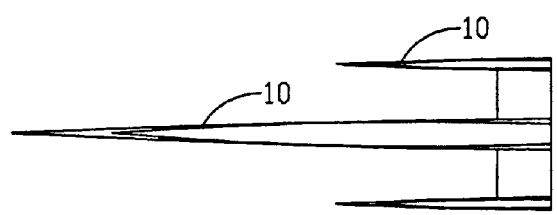
Fig. 9D    Fig. 9E

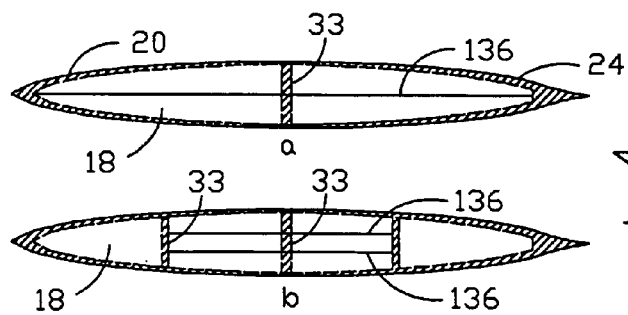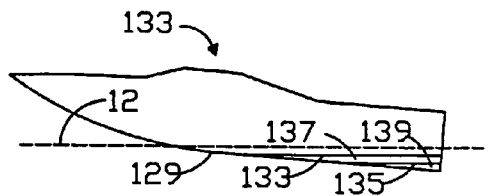
Fig. 20A   Fig. 20B
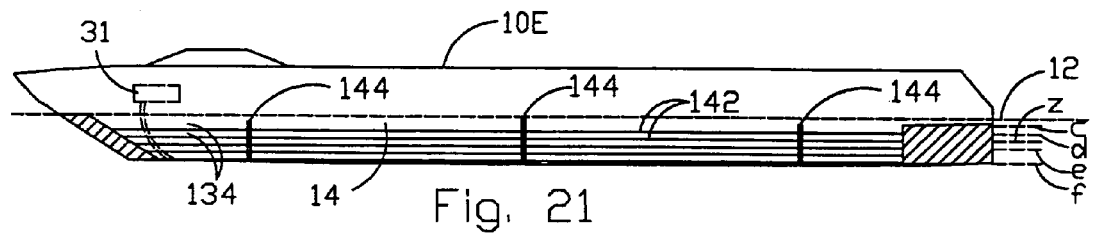
Fig. 21
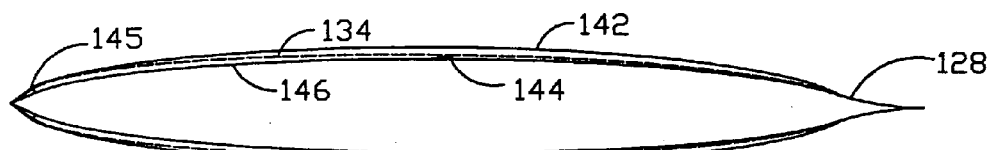
Fig. 22A
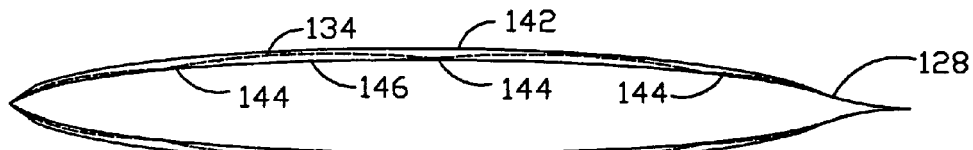
Fig. 22B
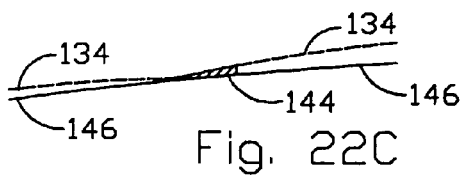
Fig. 22C

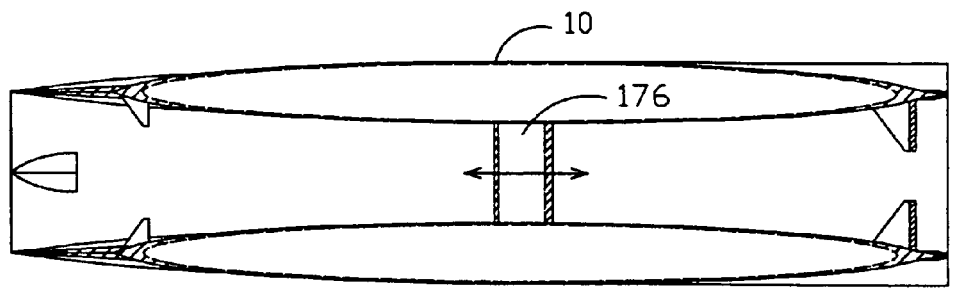
Fig. 29
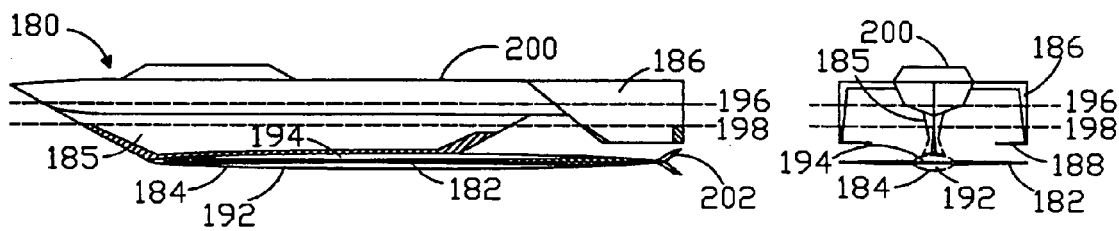
Fig. 30 A            Fig. 30 C
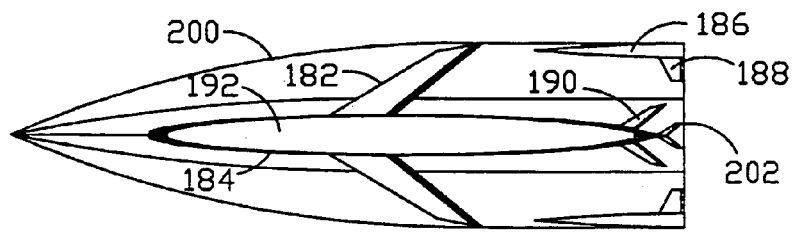
Fig. 30 B
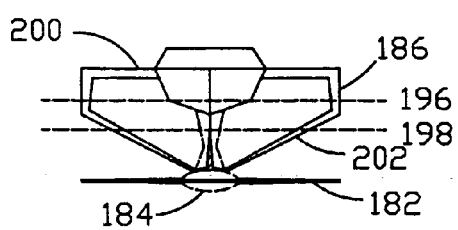  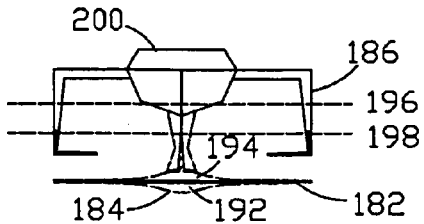
Fig. 31A            Fig. 31B

LOW DRAG SHIP HULL

BACKGROUND OF THE INVENTION

This invention applies to the field of hydrodynamics, and relates to the use of gas cavities to reduce the frictional drag of ship hulls.

The reduction of frictional drag provides basic benefits: power is reduced, and fuel consumption is reduced. These benefits reduce the weight of a vessel, which further reduces power and fuel consumption compared with a fully wetted vessel designed for a given payload and range. Alternatively, vessel speed can be significantly increased with the same displacement, power, payload and range. Cost and time for payload delivery are greatly reduced by reducing drag.

Past work on the use air cavities to reduce hull drag includes different kinds of surface effect ships (SES). These vessels use a pocket of compressed air on the underside of a vessel to support the weight of the vessel and reduce frictional drag. SES design speeds range from low to very high. Some SES vessels resemble conventional ships with the addition of bottom side fences and bottom forward and aft barriers to contain a pocket of pressurized air. Other SES vessels have catamaran hulls with cavities under the hulls to contain pockets of pressurized air.

Although drag is significantly reduced by SES craft, considerable wetted surface area remains, together with significant wavemaking drag and other sources of drag including the drag of side fences.

The problem is how to design underwater surfaces to make full use of air cavities to minimize wetted surface area and maximize drag reduction. The need clearly exists for improved low drag ship hulls.

SUMMARY OF THE INVENTION

The low drag hull of the present invention uses air cavities to significantly reduce hull drag. This invention applies to most types and sizes of ships and boats. Its advantages include a large savings in fuel and vessel costs, and improvements in range, speed, payload, sea kindliness, and quietness. Applications for this invention include military, other government, state, commercial, and recreational uses.

Air cavities are used to reduce wetted surface areas by large factors. Frictional drag in air is only 1/500 that in water. Air cavities initiated near the bow can cover up to around 90% of a ship's wetted area. Wavemaking and other kinds of drag remain, including wetted surfaces to initiate and close cavities, cavity drag, spray drag, hull air drag and equivalent air pump drag for the air pump needed to supply air to the bottom cavity. The present invention is a low drag ship hull.

The hull generally includes a side air cavity initiated by a wetted bow section, bottom air cavity initiated by wetted bottom nosepiece, wetted stern section that closes a lower portion of the side cavity, wetted bottom tailpiece that closes the bottom cavity, stabilizing fin, canard fin and propulsor.

In perfect fluid theory, a cavity wall acts like a solid wall that has no viscosity. However, hulls with cavities are much more difficult to design than conventional hulls because cavity shapes change with operating conditions. The presence of the ocean surface further complicates theory by introducing wavemaking drag, further changing cavity shapes and sizes, and introduces ocean waves that will cause further changes in cavity shapes.

Fortunately, cavity theory is primarily a Froude number phenomenon, not a Reynolds number (viscosity) phenomenon. However, viscosity can still be significant in water flow with cavities. Cavity physics shows that, when side cavities are at atmospheric pressure, then their thickness/chord ratios increase with depth, and reduce with the square of speed. Therefore, atmospheric cavities tend to appear triangular in front view since they get wider with depth.

If cavities are at atmospheric pressure, then the sides of hulls generate no buoyancy or lift, so all lift must be supplied by bottom pressure. For example, if side cavities are triangular in front view, and if bottom lift is equated to the displacement, then bottom pressure must be at about half depth pressure. Alternatively, if a front view of a hull is rectangular, then the bottom pressure must be at depth pressure to provide a lift equal to buoyancy. Therefore, bottom pressure will lie between half and full depth pressure unless some additional dynamic lift is provided. Also, cavity physics indicates that bottom cavities that are at or above depth pressure can be unstable.

The air system for bottom cavities typically comprises one or more systems that include an air pump that supplies air through an airflow regulator that leads to one or more air injectors in each hull bottom. If needed, a control means is provided to automatically control airflow rate and/or pressure as a function of vessel speed and other variables.

Off-design conditions include changes in speed, depth, and angles of attack and yaw from a design condition. These changes provide insight into the effects of waves, maneuvering, and changes in speed. For example, waves change the effective depth, angle of attack, yaw angle and forward speed.

The low drag hull concept can be applied to a wide variety of vessel architectures, including monohull and multi hull designs. The cross structure of a catamaran version of the hull may include a bow impact alleviator. Optional flaps in the stabilizing fins, together with optional all-movable canard fins or canard fins with flaps can be used to provide control over heave, pitch and roll motions of the hull. The drag of the fins can be reduced using the air cavity hydrofoil drag reduction technology described in Lang U.S. Pat. Nos. 6,167,829 and 6,439,148. The fins may be positioned on either or both sides of hulls, including monohull and multi hull designs. Stabilizing fins are optional on lower speed hulls, and canard fins may be optional on all hulls. Hull shapes having a small water plane area provide very low motion in waves (similar to SWATH ships) and reduced wavemaking drag compared with typical hulls.

Air cavities on the sides of the present new low drag hulls are preferably at atmospheric pressure. These side cavities are "open" near the water surface (closing behind the vessel), and "closed" elsewhere (closing on the aft end of the hull). The bottom cavities on a hull are preferably closed, and require pressurized air; cavity pressures are typically less than depth pressure. Closed cavities preferably terminate with a wetted, cusp-shaped tailpiece.

Multiple side and bottom cavities may be used to maximize cavity coverage for off design conditions and for reaching design speed among other reasons. Each new cavity may be initiated either by a wetted step-like protuberance or a discontinuity in the surface that causes the water flow to separate from the surface; additionally, air must be introduced to form a cavity, except for side cavities that are open to the atmosphere. Multiple steps can lie under a design cavity, and then form new cavities under off-design conditions if the outside water flow contacts the hull. Among other alternatives, multiple cavities can be formed as needed by mechanically forming a new step to initiate a new cavity.

Automatic control may be needed to control cavities for off-design operating conditions, including getting up to speed, changes in speed, maneuvering and operation in waves. Cavities may even be controlled as a vessel travels through a wave to maximize drag reduction. Sensors for an automatic control system may include pressure taps at various locations, and means to measure cavity length. Also, hulls may require rudders or fins near the stern for stability and control.

Vessel types for most applications may be catamaran versions. Some vessel shapes may be trimarans, while others may be monohulls. Still other shapes may include four, five or more hulls.

Drag reduction greatly improves vessel performance. If vessel range, speed and payload are fixed, and drag is reduced, then the weights of the propulsion and fuel systems are reduced. These changes reduce ship weight, which further reduces propulsion and fuel systems weight. Fuel cost is reduced in proportion to the final power, and ship cost is reduced approximately in proportion to the final displacement.

Differences exist between an open cavity and a closed cavity. Each cavity is formed behind a wetted nosepiece. The open cavity closes naturally behind the vessel, while the ideal closed cavity closes smoothly on solid surface. Drag is cancelled for closed cavities by a thrust acting on a surface, while drag for open cavities is not cancelled.

Different wetted bow sections are used for starting side cavities. Wedge-shaped bow sections utilize an obtuse angle to separate water flow from a surface. An increase in surface curvature is another way to separate the water flow. A step both separates the water flow and provides a larger duct area for air to flow into a side cavity. A combination step-and-notch separates the water flow and provides an even larger duct area for the air. Convex bow surface, concave bow surface and a flat bow are alternative wetted bow shapes. Side cavity initiators can be used to initiate a bottom cavity. It is noted that steps can be added in the form of a strip to a side or bottom of an existing ship hull or planing craft to reduce drag.

Retractable means can also be used to initiate side cavities. A plate is canted outward from a bow surface to separate water flow from the bow surface and form a cavity. A transverse plate separates water flow by being projected outward from a bow surface. A wetted nosepiece slides forward from a bow surface to separate water flow and form a cavity. When retracted, all three of these retractable means are examples of means to provide a smooth surface without a cavity, which may be desired to reduce drag at low speeds. These side cavity initiators can also be used to initiate a bottom cavity.

An engine driving a water jet, whose inlet is located in the wetted bottom tailpiece, or a similar inboard engine section with a propeller are examples of alternative propulsors. A rudder is shown positioned behind the propeller. Turning is provided either by water jet or rudder.

The shape in the closed cavity region follows from cavity physics.

Because of cavity physics, the hull beam tends to approach a maximum near the bottom. Most hull shapes of the present invention are unlike existing hull shapes. The waterplane area is generally small, so catamaran or trimaran versions may be needed to provide static stability in roll. However, the present hull designs can vary significantly in shape with design approach and Froude number. For example, low-speed hulls designed for volumetric Froude numbers less than about 1.0 might resemble a conventional monohull. The unusual shapes of the present hulls stem from the desire to form a single cavity on each side of the hull that is filled with air at atmospheric pressure. Such a single, closed cavity on each side requires that the cavity thickness increase approximately with depth.

Hull beam changes less with depth as speed increases. Therefore, high-performance low drag hulls will not widen at the bottom as much as moderate-performance ship hulls.

Alternative hull configurations comprising a monohull and a trimaran are utilized. For static stability in roll, a monohull version must typically have either a low center of gravity, or a widened beam at the surface. The trimaran version relies on side hulls to provide the necessary static stability in roll. These side hulls preferably utilize the same low drag hull as the main hull, but are shaped differently because they operate at a higher volumetric Froude number.

A low drag hull may utilize multiple cavities to maximize cavity coverage under off-design conditions, reduce beam, and help in other ways; the downside is typically increased wetted surface and drag. Three side cavities may be used. A wetted bottom nosepiece initiates a bottom cavity, and a wetted bottom tailpiece smoothly closes the cavity.

A new type of low drag hull includes a new upper bottom air cavity that is initiated by an upper bottom wetted nosepiece, and closed by an upper bottom tailpiece. The preferred pressure in the upper bottom cavity is atmospheric, so it will merge with side cavities to form a new combined cavity at atmospheric pressure.

Many overall planform shapes are possible. The bottom shapes include bottom cavity, wetted bottom nosepiece and wetted bottom tailpiece. Some of these shapes provide dynamic stability in pitch without the need for stabilizing fins. Flaps can be placed in the aft regions of the hulls to provide dynamic control in pitch, heave and roll. These flaps can also serve to control the upper bottom cavity and the bottom cavity.

A canard and a stabilizing fin that include air cavities reduce hydrofoil frictional drag. Wetted areas at the base of either fin are eliminated if the fin is attached to a wetted region on a hull, or if upper and lower fin cavities are at the same relative pressures as upper and lower cavities on the hull. These fins could be fully wetted, if desired.

A wetted fence may be used to separate a side cavity from an upper bottom cavity in the case where the pressure in the upper bottom cavity is either above atmospheric pressure, or at a different pressure than the side cavity.

An alternative design has an upper hull divided into a shortened forward hull and a shortened aft hull to further reduce drag, weight, and motion in waves. The pressure difference between the bottom cavity and upper cavity provides a dynamic lift that is either greater than or equal to the buoyancy of the submerged components and their cavities. As a result, the water line at design speed is lower on the hull than the at-rest waterline. The wetted areas at design speed are shaded. The upper and lower wetted tailpieces on the hull join at a trailing edge to provide a hydrofoil-like Kutta condition that permits dynamic lift. The propulsor may be a wetted propeller, superventilated propeller, pump-jet or a low drag propeller with a cavity on each side of the blades.

Another alternative is a hydrofoil-assisted trimaran with low drag hulls. A hydrofoil is attached to a low drag lower hull. Low drag side hulls with cavities provide static stability in roll. Optional tip fins near the bottom of the side hulls provide dynamic stability in pitch, add damping in roll, and if controllable, could provide heave, pitch and roll control to augment or replace the stabilizing and control functions of fins that are attached to the lower hull. The pressure differential between the bottom cavity and the upper bottom cavity supports a portion of vessel weight. The remaining weight portion is supplied by dynamic lift on the hydrofoil. The at-rest waterline lies above the design speed waterline on the main low drag hull. It is noted that interference drag can typically be reduced between a lower hull and an attached hydrofoil by adding fillets. Fillets include large fillets such as those called "blended wing/body shapes" that are being proposed for high speed aircraft.

Low drag hulls can also be designed for low volumetric Froude numbers. Low Fv hulls have many more steps that form side cavities as depth increases. A preferred version of a low-Fv hull has side cavities at atmospheric pressure. A wetted nosepiece initiates the first cavity at all depths, and wetted tailpiece closes the last side cavity at depths below where the side cavities first close on the hull. These low Fv hull shapes are applicable as monohulls, in addition to multi-hulled vessels. Front view shapes can vary.

Side cavity numbers can vary; more cavities tend to reduce cavity closure losses, but increase wetted area. A step closes a forward bottom cavity and starts an aft bottom cavity. A wetted bottom tailpiece closes the aft bottom cavity. The number of bottom cavities can vary from one to many. Note that the shapes of hull cross-sections, steps and cavities all vary with depth. Many variations in step numbers and locations, and in hull shapes and cavity shapes are possible, and may be feasible in different design situations. Alternatively, a hull bottom can be wetted if desired, but drag increases.

It is noted that a low drag hull can be designed for most values of Fv. Fewer fences and steps are needed as the design Fv increases. Compressed air is supplied at the appropriate pressure to each pressurized side cavity that lies below each side fence by a control system, which includes means to deliver compressed air, and may include means to control cavity pressures and/or airflow rates, which may be done as a function of speed, depth and other variables.

Low drag hulls can also reduce wavemaking drag, especially on hulls designed for moderate and high Fv, where wavemaking drag is significant. Hulls with a triangular frontal shape have reduced wavemaking drag. However, wavemaking drag can be further reduced on these hulls, and on other low drag hulls, by introducing differences in side cavity sizes and shapes in vertically adjacent layers. Wavemaking drag is reduced if waves generated by one air layer interact with waves generated by an adjacent air layer in such a way that each set of waves tends to cancel the other set of waves. Model tests can be used to develop these detailed shapes. It is noted that any change in design Froude number, hull length, draft, and front profile, etc., will result in a different shape that minimizes wavemaking drag.

Whenever a cavity is isolated, such as by fences or steps, it is possible to control cavity length to a limited extent by controlling airflow rate into the cavity. It is also noted that a control system is defined to include the entire air system and associated ducts, wiring and automatic and manual controls, in addition to the systems needed for controlling ship motion, including associated sensors and controllable surfaces. Finally, it is noted that most of the various low drag hulls described herein can also be used for non-engine propelled craft such as sailboats, surfboards, kayaks, and towed craft among others.

A low drag hydrofoil can be placed near the center of gravity to help support the weight of the ship. The hydrofoil is optionally movable fore and aft to adjust for changes in longitudinal center of gravity.

A hydrofoil-assisted trimaran vessel, provided with three low drag hulls, is an alternative design of the present invention. The hydrofoil is attached to a low drag lower hull, which is supported by a low drag center hull. Low drag side hulls provide static stability in roll. Optional low drag tip fins on the side hulls provide dynamic stability in pitch, add roll damping, and if controllable, can provide heave, pitch and roll control to augment or replace the stabilizing and control functions of fins that are attached to lower hull. The pressure differential between a lower cavity and an upper cavity, acting on lower hull, together with dynamic lift from the hydrofoil, support the weight of the ship. It is noted that all underwater components, including propulsor blades, are preferably low drag shapes that have air cavities on each side.

Low drag ships can be locked together at sea to form a floating platform. For example, individual ships can transit at design speed, and then lock together to form either a temporary base, or a temporary floating airfield.

Seaplanes, and wing-in-ground-effect (WIG) craft, can utilize these low drag hulls for either take-off and landing on water, or for operating at high speed in contact with the water. Their low waterplane area provides a smoother ride in waves than conventional planing surfaces. Also, the hulls can be streamlined for operation at lower speeds, and provided with an increased surface curvature or step, as discussed elsewhere herein to form open side cavities for high speed operation. One or more bottom cavities can be used to further reduce drag.

A low drag submarine, or other kinds of submerged vessels, similar to the lower hulls of low drag ships are alternative embodiments. The submarine would utilize air cavities on each side for drag reduction. A pressurized gas supply system includes ducting to supply gas to an upper cavity at a lower pressure, and supply gas to a lower cavity at a higher pressure. The gas outlets may be located either behind the nosepieces or incorporated into the nosepieces. A relatively constant pressure difference between the two cavities is needed to support the weight of the submarine. Dynamic lift can be used to adjust for small pressure differences. The reduced drag and gas shrouding together greatly reduce radiated noise.

Many variations in design are possible, including the number of internal hulls and hull pressurization. Hatches permit entry between the internal hulls. A conning tower with a closed cavity on each side having the same cavity pressure as the upper cavity is preferred, but a fence may be used to separate the conning tower cavities from the upper hull cavity if different pressures are desired; many variations are possible, including elimination of the conning tower. A propeller, with closed cavities on blades is the preferred propulsive arrangement, but wetted propellers or alternative propulsors, including water jets or pumpjets, can be used. A vertical stabilizer or angled vertical stabilizers with closed cavities are preferred with cavity pressures the same as the adjacent upper cavity; however, fences can be used if different pressures are desired. Control is provided by an adjustable wetted hull tailpiece that acts as a flap; alternative control means are possible, including an all-moveable stabilizer. Various kinds of gas sources can be used to provide gas to the cavities.

Cavity shapes and pressures will change when maneuvering, diving, climbing, or when operating near the surface in large waves. These changes can either be tolerated with an associated increase in drag, or multiple cavities or cavity control and other ideas can be used to reduce drag.

A sonar array can be incorporated in a nosepiece and in a tailpiece. The large sonar aperture enhances performance.

Location in a laminar flow region in the nosepieces further enhances performance in addition to the reduced drag feature.

A unique feature of this submarine invention is that cavity shape can be kept about constant, independent of depth and speed, by varying submarine speed approximately with the square root of depth. Normally, cavities become longer with increased speed or reduced depth, or shorter with reduced speed or increased depth. In this submarine invention, the cavity shapes and the underlying hull shapes are developed for a given design speed and depth as a basis for use in operating at other speeds and depths with the design cavities. The profile of this submarine invention provides many advantages, even in a fully wetted condition without cavities. A preferred version includes retractable steps to minimize drag and radiated noise when operating fully wetted.

The primary technical objective of the low drag hulls of the present invention is to minimize drag by maximizing the air-covered area, and by smoothly starting and closing cavities. Secondary objectives are to minimize cavity area loss under off-design conditions, and to minimize wavemaking drag and ship motions in waves.

Calculations show that open cavities provide the least drag at, and near, the water surface, and that closed cavities provide the least drag below a certain depth. The cross over depth depends on design conditions. Side cavities are preferably at atmospheric pressure. To further maximize drag reduction, the bottom surfaces of hulls are preferably covered with closed air cavities. Ideally, the only wetted portions of the low drag hulls are a nosepiece to create cavities, a tailpiece to close the closed cavities, and a small wetted region to separate side cavities from bottom cavities. Additional wetted areas may be needed for the propulsor, and for vessel stability and control surfaces.

Designs of low drag hull shapes vary with Froude number, and with the possible exception of low Fv designs, hulls tend to be long and slender. Therefore, to achieve static roll stability, most versions tend to be catamarans or trimarans.

Horizontal cross sections of the low drag hulls of the present invention tend to vary with depth. Side views of low drag ships resemble conventional ships. Typically, hull draft reduces with length for a given displacement.

These and further and other objects and features of the invention are apparent in the disclosure, which includes the above and ongoing written specification, with the drawings.

BRIEF DESCRIPTION OF THE INVENTION

FIGS. 5a to 5f show examples of different wetted bow horizontal cross sections for starting side cavities. FIGS. 5g and 5h show examples of cross sections for steps placed along bottom or side surfaces. FIG. 5i shows a strip that can be attached to bottom or side surfaces of existing hulls for starting cavities.

FIGS. 6a–6k show examples of retractable means to form cavities at the bow, and on side or bottom surfaces.

Figures 7A, 7B:
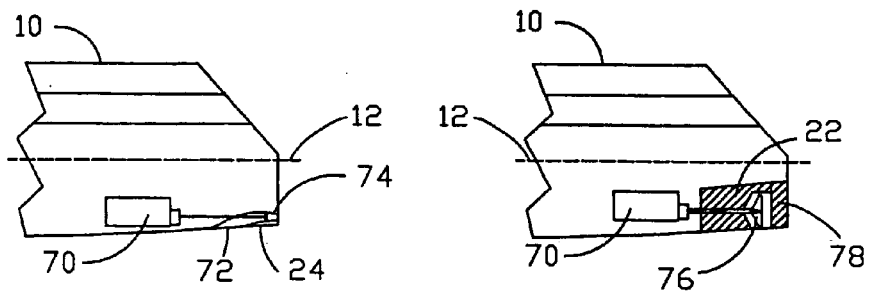

FIGS. 7A and 7B show alternative propulsion systems.

FIG. 8A, sections a–c, are outline front views of underwater hulls with side cavities that are designed, respectively, for medium, moderately high, and high volumetric Froude numbers.

FIG. 8B is an outline front view of a low drag hull similar to that in section b of FIG. 8A, but with a new wetted horizontal fence positioned near the minimum beam to separate the upper open cavity from the lower closed cavity. FIG. 8C is an outline front view where fence 81 is lowered to improve fence performance in larger waves, and includes a second fence.

FIGS. 9A–9E are examples of different kinds of low drag hull applications.

Figure 1:
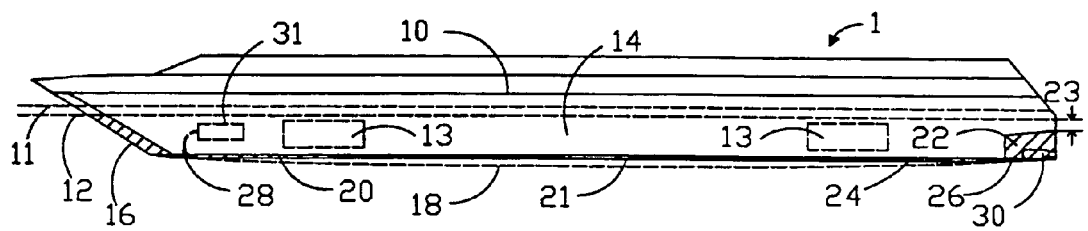
FIG. 1 is a side view of a low drag ship hull showing a side air cavity initiated by a wetted bow section, a bottom air cavity initiated by a wetted bottom nosepiece, a wetted stem section that closes a lower portion of the side cavity, a wetted bottom tailpiece that closes the bottom cavity, a stabilizing fin, a canard fin, and a propulsor.
Figure 10:
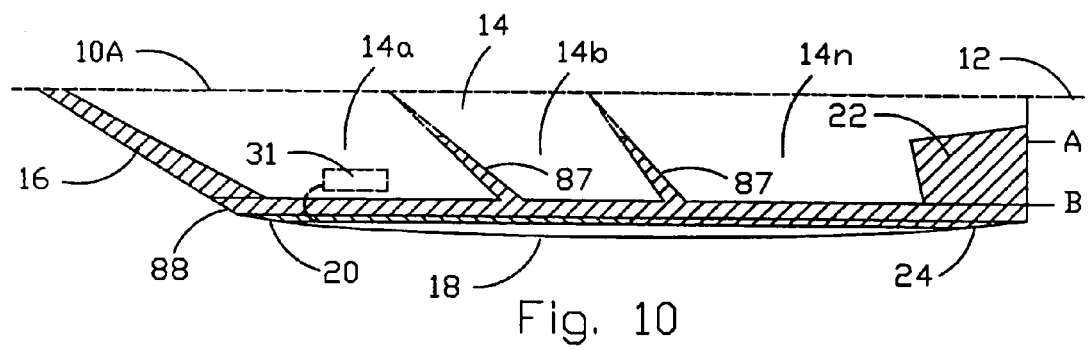

FIG. 10 shows a low drag hull, that is a modification of the low drag hull in FIG. 1, designed with multiple side cavities to help retain good cavity coverage under off-design conditions, and reduce overall hull beam.

Figure 11:
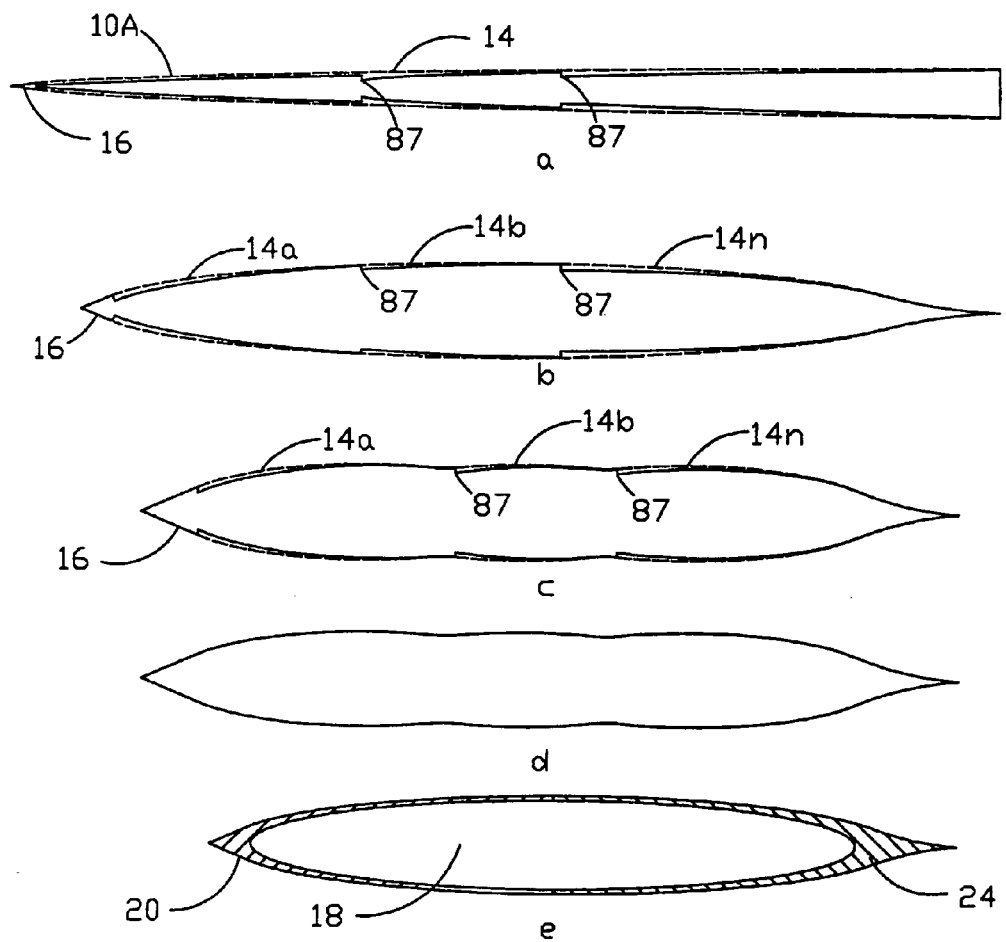

FIG. 11, sections a–d, shows horizontal cross sections of hull 10A, and FIG. 11e is a bottom view of the hull.

Figure 12A:
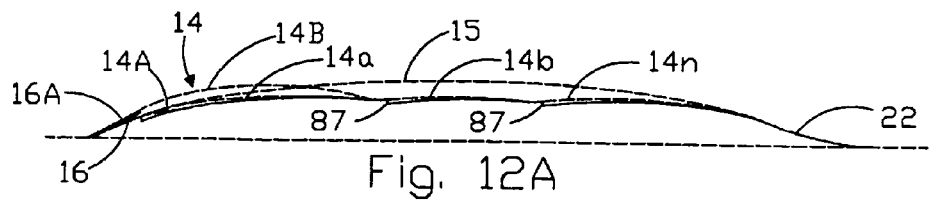
Figure 12B:
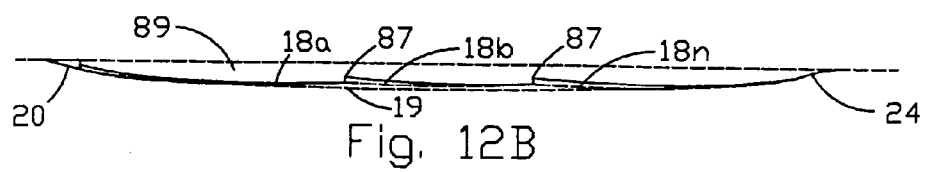

FIG. 12A includes a copy of a half hull section c in FIG. 11, and additionally shows new cavities that result from changes in speed, depth and nosepiece angle. FIG. 12B illustrates similar methods to maximize bottom cavities by using multiple cavities, and nosepiece and step angle changes, to maximize cavity coverage under off-design conditions.

Figure 13A:
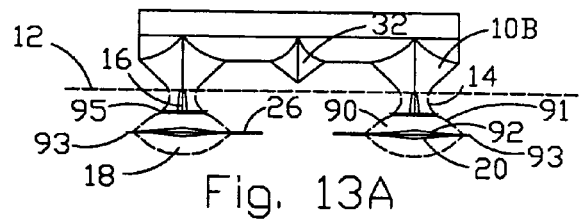
Figure 13B:
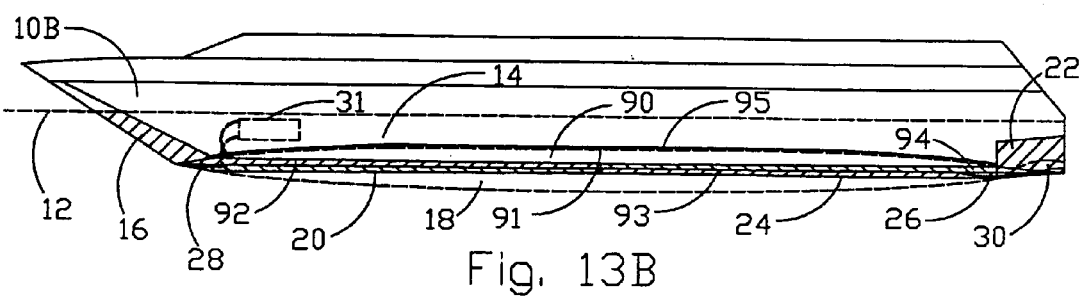
Figure 13C:
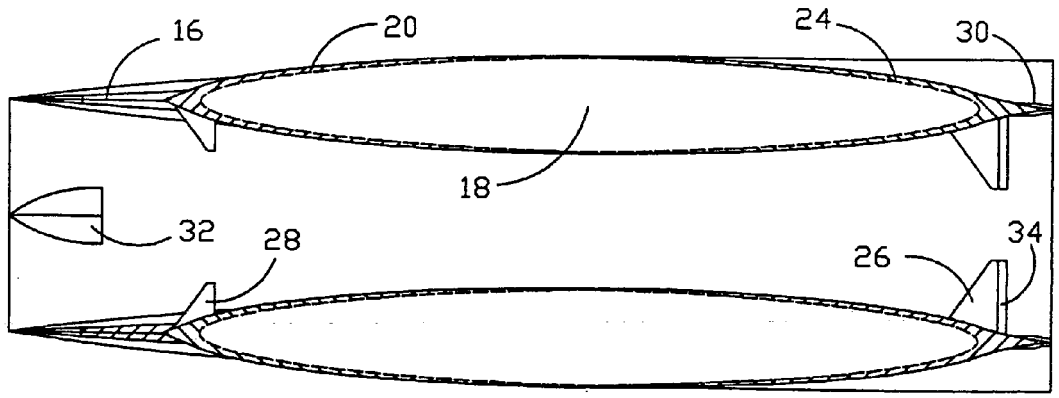
Figure 14:
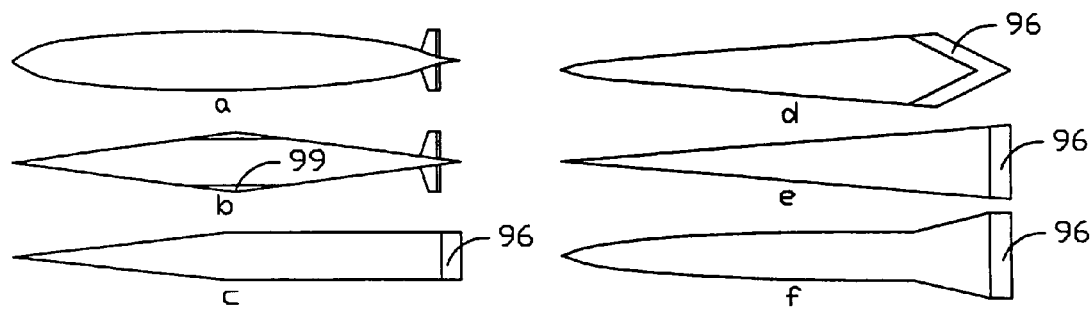

FIGS. 13A–13C are respective front, side and bottom views of new low drag hulls of the present invention that add a new, closed upper bottom air cavity to the low drag hulls designs discussed previously.

FIGS. 14a–14f show alternative planform bottom shapes for low drag hulls of the type shown in FIGS. 11–13.

Figure 15:
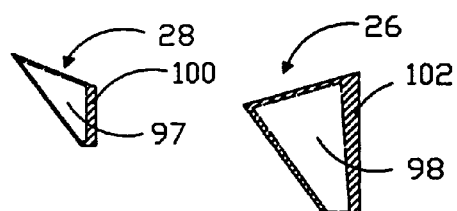

FIG. 15 shows plan views of a low drag canard and a low drag stabilizing fin that include air cavities on each side of the fins to reduce hydrofoil frictional drag.

FIGS. 16a and 16b show front views of alternative low drag hulls that have an upper bottom cavity and a bottom cavity.

Figure 17:
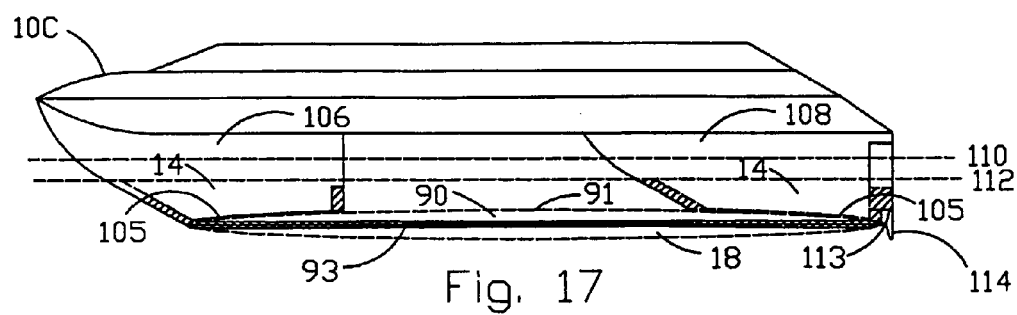

FIG. 17 is a side view of a new low drag hull that differs from previous hulls having an upper bottom cavity by separating the upper hull into a forward low drag hull spaced ahead of an aft low drag hull.

Figures 18A, 18B, 19:
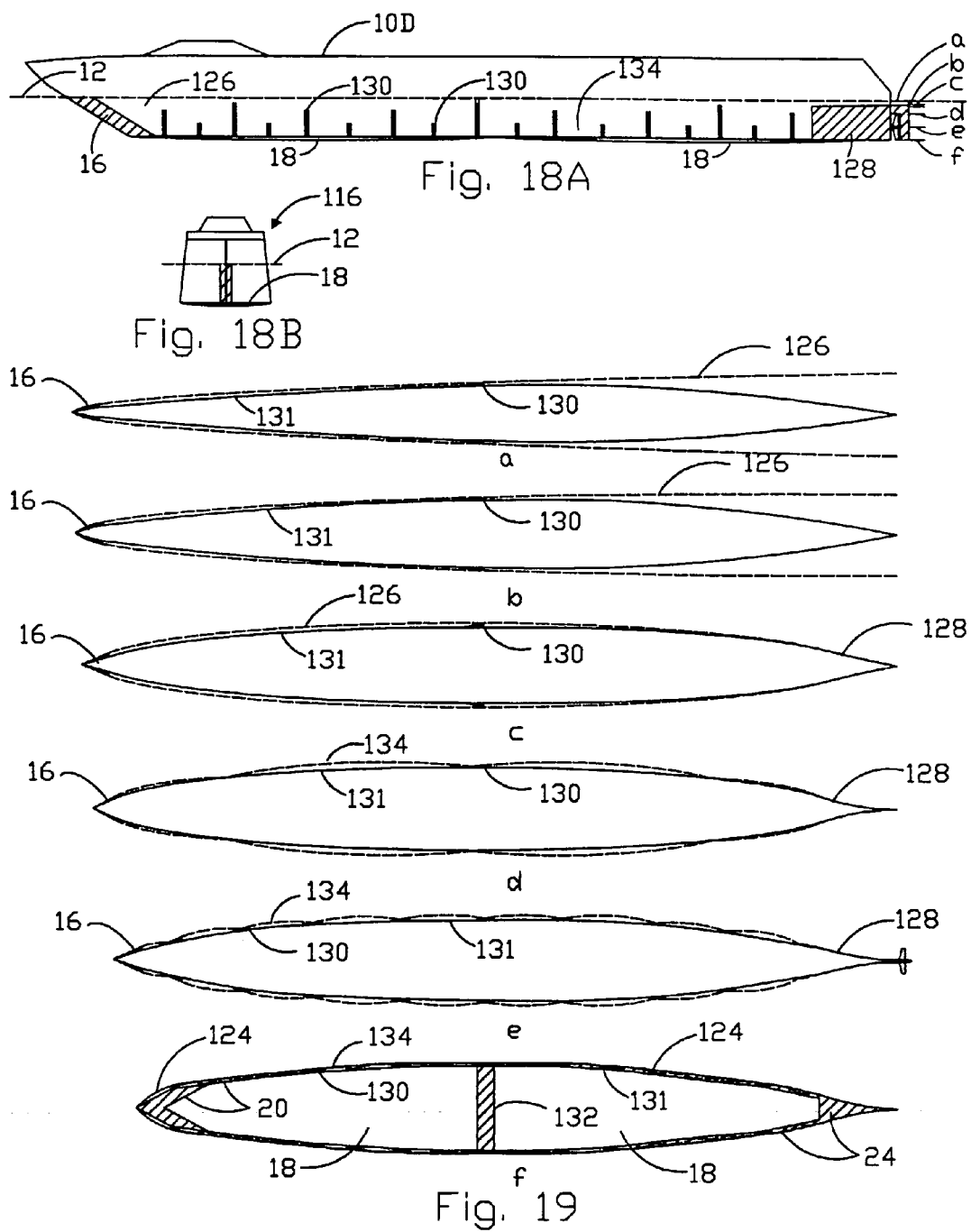

FIGS. 18A and 18B are respective side and front views of a low drag hull designed for low volumetric Froude numbers, Fv.

FIG. 18B is a front view of low-Fv hull which more-closely resembles a conventional ship hull than low drag hulls designed for moderate and high Fv.

FIG. 19 shows horizontal cross sections a–f corresponding to depths a–f shown in FIG. 18A. FIG. 19f additionally includes a bottom view.

In FIG. 20A, sections a and b are bottom views of low drag hulls showing different bottom cavity options that augment those shown previously. FIG. 20B shows how fences and steps can be added to a conventional planing hull to reduce drag.

FIG. 21 is a side view of a new low drag hull that includes horizontal fences starting at depth d, above which hull and cavity shapes are identical to those shown in FIG. 18A.

FIGS. 22A and 22B are horizontal cross sections taken at depths d– and z+, respectively. FIG. 22C shows an enlarged sectional view of a typical step.

Figure 23:
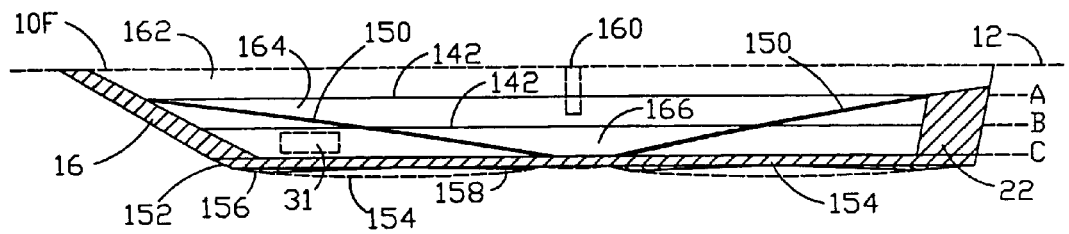

FIG. 23 shows another new low drag hull that reduces wavemaking drag; it is most applicable for hulls designed for moderate to high Fv where wavemaking drag is significant.

FIGS. 24a–c includes cross sections a–c taken at corresponding depths A, B and C shown in FIG. 23. FIG. 24d is a bottom view of hull that shows the hull up to depth C.

Figure 25:
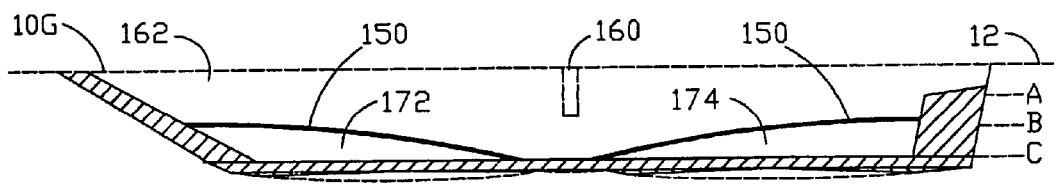

FIG. 25 shows a new low drag hull that illustrates still another way to reduce wavemaking drag.

Figure 26:
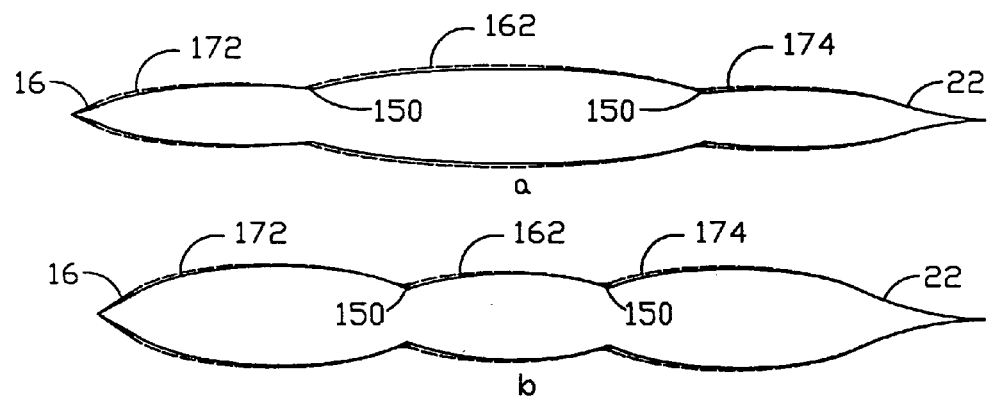

In FIG. 26, sections a and b are cross sections corresponding to depths B and C, respectively, in FIG. 25, which are designed to minimize wavemaking drag.

Figure 27:
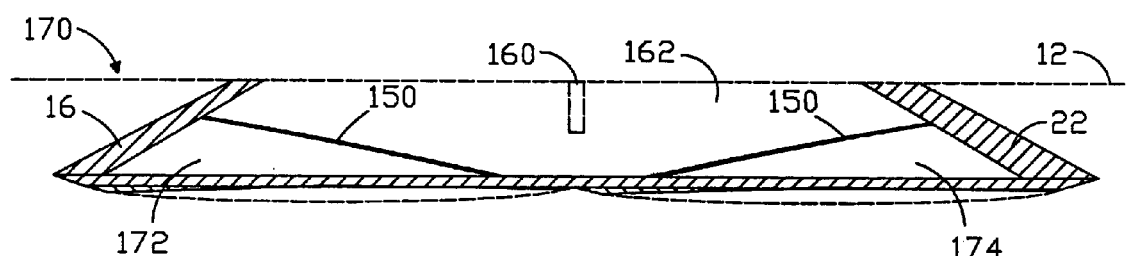

FIG. 27 shows still another way to reduce wavemaking drag.

Figure 28A:
Figure 28B:
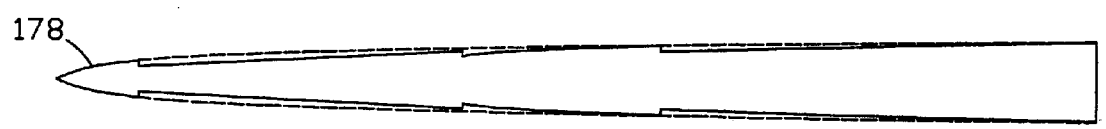

FIGS. 28A and 28B shows how side cavities can be enlarged, if desired, by using nosepieces or steps that are larger and longer than usual in cross section, in order to open a wider cavity.

FIG. 29 shows a bottom view of hull in FIG. 1, with low drag hydrofoil placed near the center of gravity to help support the weight of the ship.

FIGS. 30A–30C are respective side, bottom and front views of a hydrofoil-assisted trimaran vessel provided with three low drag hulls.

FIGS. 31A and 31B are front views of alternative versions of the low drag trimaran similar to that shown in FIG. 30C. FIG. 31B additionally shows a blended foil/lower-hull shape.

Figure 32:
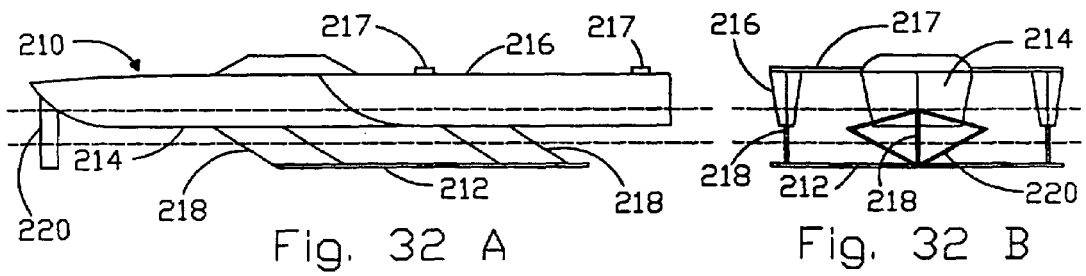
Figure 32:
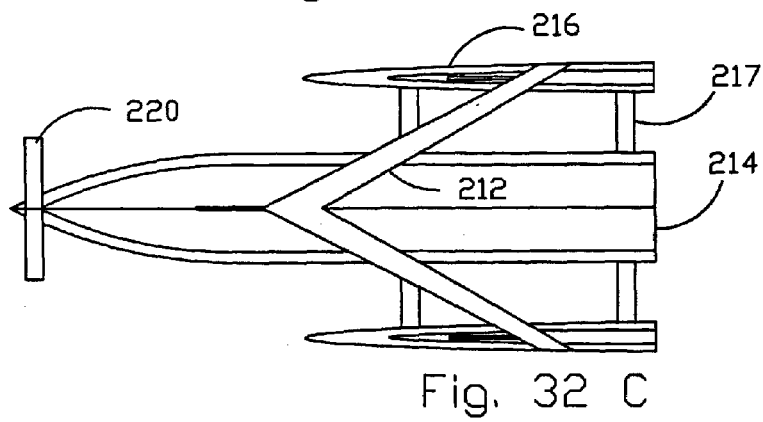

FIGS. 32A–32C are respective side, front and bottom views of hydrofoil boat.

Figure 33A:
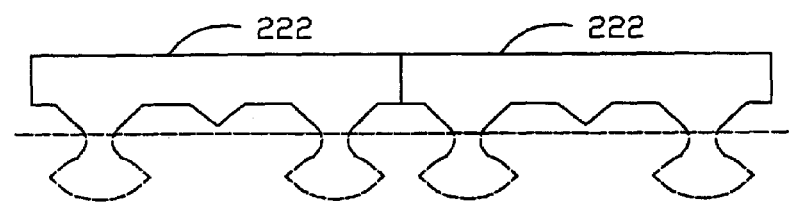
Figure 33B:
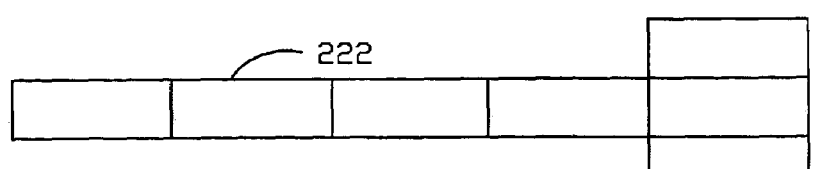

FIGS. 33A and 33B show how low drag ships can be locked together at sea to form a floating platform.

Figure 16:
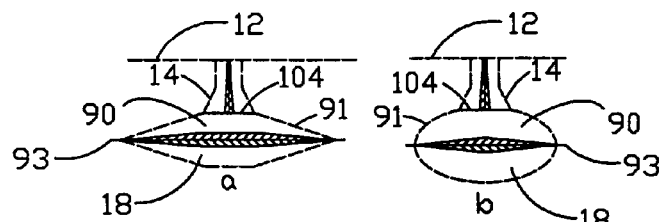
Figure 34A:
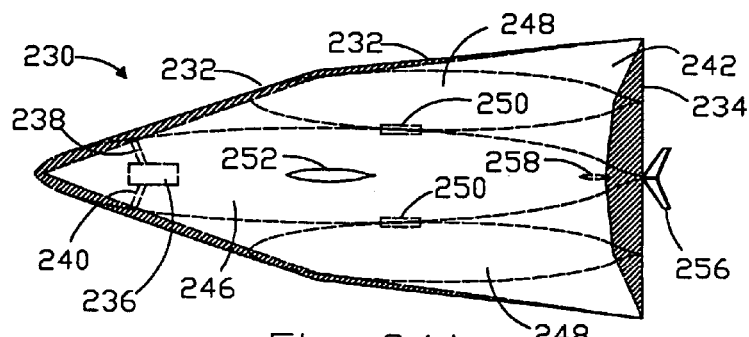
Figure 34B:
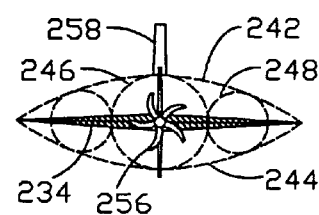
Figure 34C:
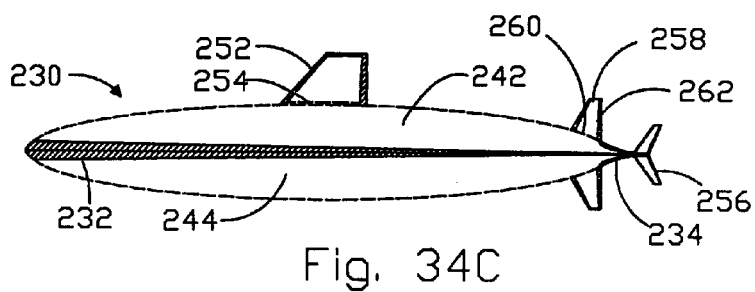
Figure 34D:
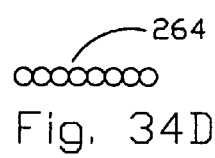

FIGS. 34A, 34B and 34C are respective top, stern, and side views of a low drag submarine that is similar to the lower hulls of low drag ships shown in FIGS. 13, 16 and 17, and that utilize air cavities on each side for drag reduction. FIG. 34D schematically shows a sonar array that can be incorporated into a nosepiece and tailpiece.

Figure 35:
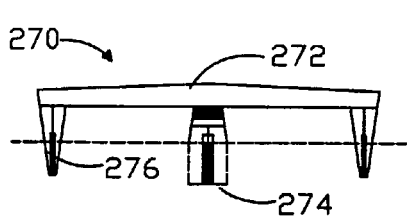
Figure 36:
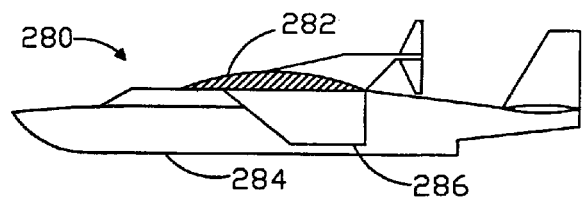

FIGS. 35 and 36 show how low drag hulls can be used for WIGs and seaplanes to reduce drag and motions in waves when operating, landing or taking off.

Figure 37:
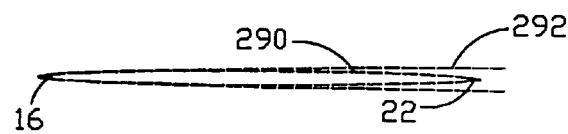

FIG. 37 shows a low drag hull streamlines in horizontal cross section behind a nosepiece that forms a closed cavity to reduce drag at lower speeds and an open cavity on the hull sides at high speeds.

DETAILED DESCRIPTION OF THE PREFERRED EMBODIMENTS

A low drag ship hull generally includes a side air cavity initiated by a wetted bow section, bottom air cavity initiated by a wetted bottom nosepiece, wetted stem section that closes a lower portion of the side cavity, wetted bottom tailpiece that closes the bottom cavity, stabilizing fin, canard fin, and propulsor. The cross structure of the catamaran hull includes a bow impact alleviator. Optional flaps in the stabilizing fins, together with optional all-movable canard fins or canard fins with flaps, are used for control. Different wetted bow sections and retractable means are used for starting side cavities. A low drag hull may utilize multiple cavities to maximize cavity coverage under off-design conditions, reduce beam, and help in other ways. A new low drag hull includes a new upper bottom air cavity that is initiated by an upper bottom wetted nosepiece, and closed by an upper bottom tailpiece. An alternative design has a new, shortened forward hull spaced ahead of a shortened aft hull to further reduce drag, weight, and motion in waves. Another alternative is a hydrofoil-supported trimaran with low drag hulls.

FIG. 1 shows a side view of a monohull ship 1 having inventive low drag hull 10 showing a waterline 11 at rest, and a waterline 12 at design speed. Drag reducing side air cavity 14 is initiated by wetted bow section 16. Drag reducing bottom air cavity 18 is initiated by wetted bottom nosepiece 20 on bottom 21. Wetted stern section 22 closes side cavity 14 below depth 23. Wetted bottom tailpiece 24 closes the bottom cavity 18. Stabilizing fin 26, canard fin 28, and propulsor 30 are mounted on hull 10.

Control system 31 provides pressurized air to bottom cavities 18, and contains manual or automatic controls needed to adjust bottom airflow rates, fin or flap angles, vessel speed, depth, turn rates and other functions. Side cavities 14 are ventilated directly from the atmosphere for simplicity, and to minimize the effects of waves on cavity shape. Optionally, additional air at atmospheric pressure can be injected behind the bow section to help form and to maintain the side cavities. It is noted that, when side cavities are at atmospheric pressure, hull lift is provided only by pressure on the hull bottom area. It is also noted that the overall hull-and-cavity displacement increases when cavities are formed. Preferably, the bottom lift is about equal to the displacement of the hull and cavity; therefore, at-rest waterline 11 will be somewhat higher on the hull than design waterline 12 when underway.

Optional design items include stabilizing fins 26, which are not needed at low Froude numbers. Also, these fins are optionally controllable to control vessel heave, pitch and roll. Canard fins 28 are optional, but aid in motion damping, and provide control over heave, pitch and roll. The number of bottom cavities may vary from zero for the wetted bottom case, to many cavities. Optional bottom steps 33, that close a preceding cavity and open a following cavity, are used when more than one bottom cavity is desired. Separate ballast and fuel tanks, shown schematically together as 13, optionally provide control over vessel longitudinal and lateral centers of gravity, and vessel weight and draft. Also optional, is automation of control system 31.

Figure 2:
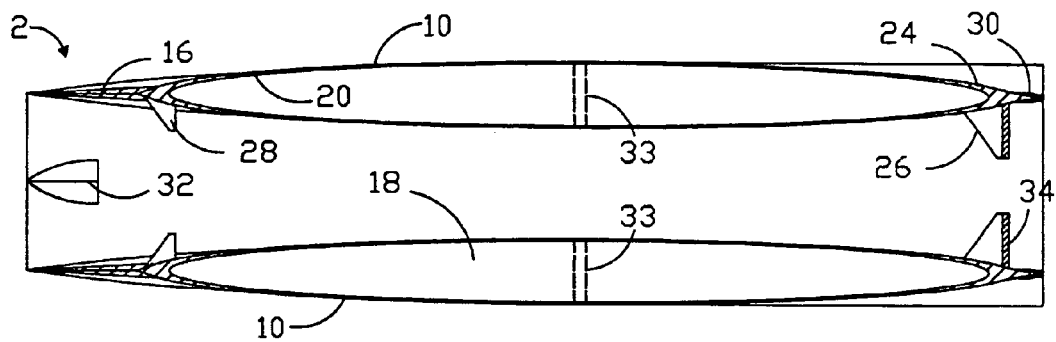
FIG. 2 shows a bottom view of a catamaran ship showing two low drag hulls, including bow impact alleviator.

FIG. 2 shows a bottom view of a catamaran ship 2 showing two low drag hulls 10, including bow impact alleviator 32. Optional flaps 34 in the stabilizing fins 26, together with optional all-movable canard fins 28, or flaps in the canard fins, can be used to provide control over heave, pitch and roll motions of the hull. Using air cavities, as described in Lang U.S. Pat. Nos. 6,167,829 and 6,439,148, reduces fin drag. The fins 26 and 28 may be positioned on either or both sides of each catamaran hull 10.

Figure 3:
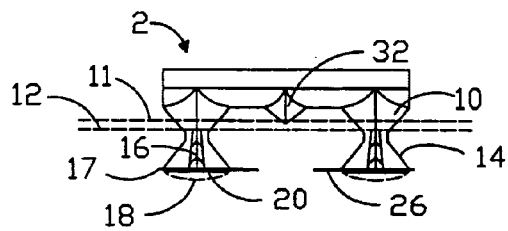
FIG. 3 shows a front view of ship and low drag hulls.

FIG. 3 shows a front view of ship 2 and low drag hulls 10. Notice the small waterplane area that is similar to SWATH ships described in Lang U.S. Pat. Nos. 3,623,444; 3,730,123; 3,830,178; 3,842,772; 3,866,557; 3,897,744; 4,440,103; and 4,944,238. Hull shapes having a small waterplane area provide very low motion in waves compared with typical hulls. The shape of closed cavities is determined by cavity physics that shows that the thickness-to-chord ratio of a 2-d cavity filled with atmospheric pressure increases with depth. Therefore, side cavity 14 in the closed-cavity region appears triangular in front view. Wetted regions 20 and 24, shown in FIG. 2, separate side cavities from bottom cavities 18. If needed, horizontal fences 17 are used to better isolate these cavities.

Bottom cavity 18 is formed by horizontal nosepiece 20 shown in FIG. 3. Therefore, bottom cavity sections tend to lie at right angles to side cavity sections. The vertical thickness-to-chord ratio in bottom cavity 18 tends to be the same at any spanwise cross section, and reduces as cavity pressure approaches depth pressure. Preferably, bottom cavity pressure is designed to be less than depth pressure; otherwise, bottom cavities can become unstable, and typically require side plates to contain them. If a frontal section of the hull 10 is triangular-like, as shown in FIG. 3, then the bottom pressure must lie closer to mid-depth pressure than to bottom depth pressure. Alternatively, if a frontal section is rectangular, then bottom pressure must be close to bottom depth pressure.

Figure 4A:
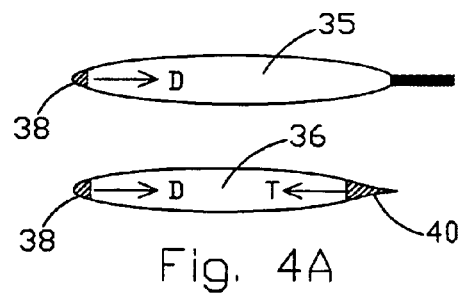
FIG. 4A illustrates the difference between an open cavity and a closed cavity.

FIG. 4A illustrates the difference between an open cavity 35 and a closed cavity 36. Each cavity is formed behind a wetted nosepiece 38. The open cavity 35 closes aft of the underwater surface, while the closed cavity 36 closes smoothly on underwater surface 40. Drag D can theoretically be cancelled for closed cavities 36 by a thrust T acting on surface 40, while drag D for open cavities 34 is not cancelled. However, at shallow depths, open cavities 35 can have less drag than a closed cavity 36; consequently, side cavity 14, shown in FIG. 1, is shown open near the surface, and closed by a wetted stem section 22 starting a short distance 23 below waterline 12 in FIG. 1.

Figure 4B:
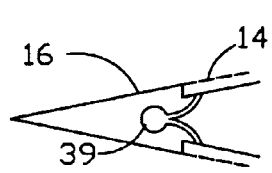
FIGS. 4B to 4D illustrate the use of air pumps, air suction and grooves to help initiate and close cavities.

FIG. 4B illustrates how cavity ventilation can be augmented through the use of air pump 39 to pump additional air into a side cavity or a bottom cavity that is formed behind either a nosepiece or a step. Typically, side cavities vent naturally from the atmosphere, but sometimes might require additional air. Side cavities that are under pressure, and bottom cavities, always require an air pump.

Figure 4C:
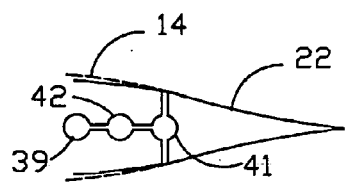

FIG. 4C illustrates how suction can help close a cavity at either a tailpiece or a step with less energy loss. Suction pump 41 removes air and water from the end of cavity 14. Water separator 42 separates the water and ducts air to pump 39 for re-use, which is an option to save energy for filling cavities that are under pressure.

Figure 4D:
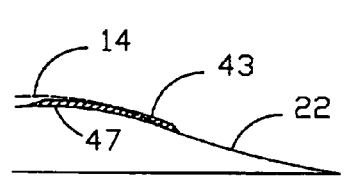

FIG. 4D illustrates the use of longitudinal hull ridges 43 that are attached to hull 47 to help terminate a closed cavity 14 more smoothly, such as at a tailpiece 22 or at a step, with less energy loss. The hull ridges are shown in side view; in front view, the ridges would appear as a series of vee-shapes. The ridges start by lying inside cavity 14. As the cavity closes, it first contacts the outer edges of the ridges. As closure proceeds, the cavity contacts more of the ridges until it fully closes on the ridges. Energy is saved because the ridges tend to contain the cavity splash that would otherwise be much larger, and would collect ahead of the cavity closure point.

Figure 5:
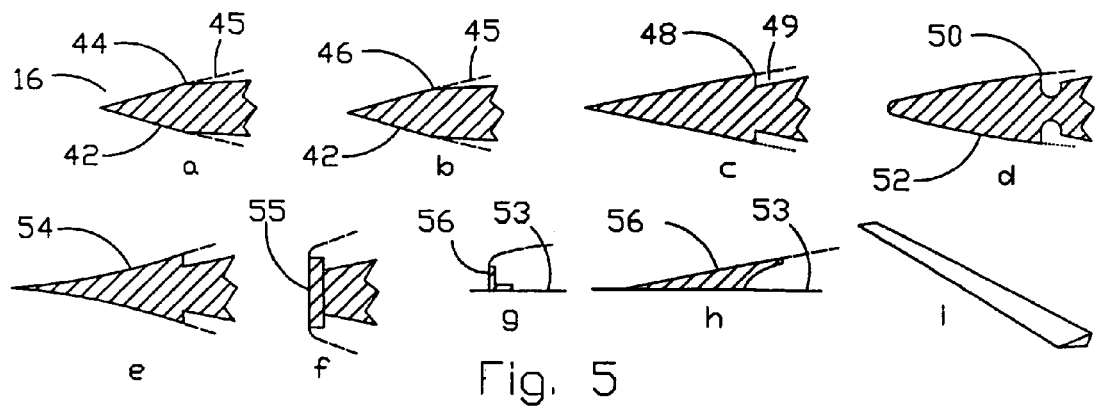
Figure 6:
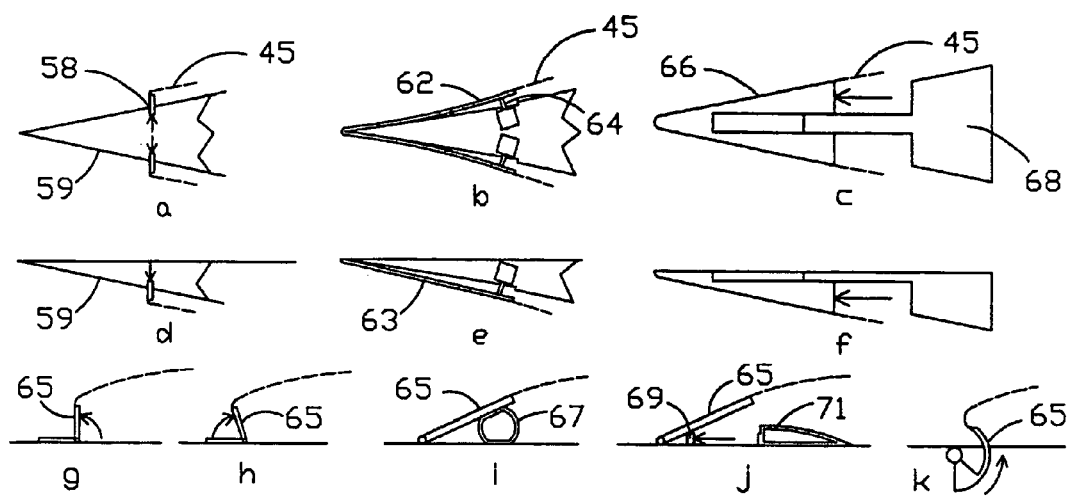

FIGS. 5a to 5f show examples of different wetted bow horizontal cross sections 16 for starting side cavities. Wedge-shaped bow section 42, shown in FIG. 5a, utilizes an obtuse angle 44 to separate water flow from a surface. An increase in surface curvature 46, shown in FIG. 5b, is another way to separate the water flow. A step 48, shown in FIG. 5c, is used to both separate the water flow and provide a larger duct area 49 for air to flow into a side cavity. Combination step-and-notch 50, shown in FIG. 5d, separates the water flow and provides an even larger duct area for the air. Convex bow surface 52, concave bow surface 54 and a flat bow 55, shown in FIG. 5d–5f, show the wide range in bow curvature and shape that can be used. FIGS. 5g and 5h show examples of steps 56 that can be attached to a flat or streamlined surface 53 to start a cavity. FIG. 5i shows a strip that can be attached either to an underwater surface of a low drag hull to start a cavity, or to an existing ship hull or planing craft to form a cavity to reduce drag.

FIGS. 6a–6f, show examples of retractable means to form cavities at the bow, and on side or bottom surfaces. FIGS. 6a and 6d show how transverse plates 58 are moved outward from a surface 59 to separate the water flow and form cavity 45. FIGS. 6b and 6e show how either a flexible plate 62 or a rigid plate 63 can be angled outward to separate the water flow and form a cavity, such as by lengthening actuator 64. FIGS. 6c and 6f show a wetted surface 66 that slides forward from body 68 to separate the water flow and form a cavity. When retracted, each of these retractable means provides a smooth surface, which may be desired at low speeds. FIGS. 6g to 6j show how hinged plates 65 can be moved outward from a surface to form a cavity. In section 6g, the plate is moved forward against water pressure. FIG. 6h shows how water pressure can be used to move a plate 65 which can be adjusted by various means, including a spring. FIG. 6i shows how the plate can be moved outward by inflating a tube 67. FIG. 6j illustrates how bar 69 can be moved forward from streamlining member 71 to deflect plate 65 outward. FIG. 6k shows how a curved transverse plate 65 can be rotated outward into the flow to start and control a cavity.

FIGS. 7A and 7B show alternative propulsion systems. FIG. 7A is an aft inboard section of low drag hull 10, where engine 70 drives steerable water jet 74 whose inlet 72 is located in wetted bottom tailpiece 24. The inlet 72 can be equally well located in wetted side tailpiece 22. FIG. 7B is an alternative system where engine 70 drives propeller 76, whose blades can be wetted, superventilated, or supplied with closed cavities on one or both sides. Rudder 78 is placed behind the propeller; the hatched area is a superimposed outboard view of wetted stern section 22. Steering is accomplished by either water jet 74 or rudder 78.

FIG. 8A, sections a–c, are outline front views of underwater hulls with side cavities that are designed, respectively, for medium, moderately high, and high volumetric Froude numbers, defined as $Fv=V/(g*Vol^{1/3})^{1/2}$, where V is velocity, g is acceleration of gravity, and Vol is displaced volume. The minimum beam 80 for side cavities is typically close to the cross over from an open cavity to a closed cavity. This cross over depth increases as Fv increases, and the angle of the closed cavity region becomes more vertical. The side cavity in section c remains open down to the bottom of the hull.

FIG. 8B is an outline front view of a low drag hull similar to that in section b of FIG. 8A, but with new horizontal fence 81 positioned near minimum beam 80 to separate the upper open cavity from the lower closed cavity, and thereby to reduce the effects of off-design conditions caused by waves, maneuvering and changes in speed. Air system 31 provides either pressurized air to lower side cavities, or controls air at atmospheric pressure to lower side cavities as the case may be, and also provides air at a higher pressure to bottom cavities 18. When pressurized, the angle of the lower side cavities becomes more vertical in front view, which reduces the hull beam at the bottom. Air system 31 may include manual or automatic control to adjust airflow rates and cavity pressures to change cavity shapes and sizes. Optionally, fence 82 can be added at the hull bottom if needed to better separate side and bottom cavities, or to reduce the area of wetted region 20.

FIG. 8C is an outline front view where fence 81 is lowered to improve fence performance in larger waves. Additional fence 81A is placed about midway between the upper fence 81 and the hull bottom to further increase side cavity pressure, reduce the beam, and reduce the pressure difference between side and bottom cavities. Also shown, is wetted bottom 83, which is a less desirable option for low drag hulls, but reduces complexity.

FIGS. 9A–9E are examples of different kinds of low drag hull applications. FIG. 9A shows a rear view of a low drag high-speed monohull having a frontal section similar to that in FIG. 8A section c. Static roll stability is provided by a low center of gravity, and widened beam at the water surface. Optional flaps or equivalent transverse plates 84 attached at the bottom near transom 85 can provide trim and roll control. FIG. 9B illustrates a trimaran version that has low drag side hulls 86 to provide static stability in roll. These side hulls preferably use the same low drag hull as the main low drag hull 10, but are shaped differently because they operate at a higher volumetric Froude number, Fv. Side view a and front view b in FIG. 9C illustrate a high-speed, mostly-submerged low drag monohull version that is shaped similar to that shown in section c of FIG. 8A. FIG. 9D is a catamaran version of a small craft with low drag hulls similar to those shown in section b of FIG. 8A, and additionally shows that fins can be added to either one or both sides of a low drag hull. FIG. 9E is a bottom view of a very-high-speed trimaran craft whose three low drag hulls 10 have frontal sections similar to that shown in section c of FIG. 8A.

FIG. 10 shows a low drag hull 10A, that is a modification of the low drag hull 10 in FIG. 1, designed with multiple side cavities 14 to help retain good cavity 14 coverage under off-design conditions, and reduce overall hull beam. Side cavity 14 is open at the water surface 12, begins to close just above depth A, and fully wets tailpiece 22 at depth A. Steps 87 lie just inside side cavity 14 down to depth A. Below depth A, steps 87 divide cavity 14 into three cavities 14a, b, and n, each filed with air at atmospheric pressure. New wetted region 88 serves to transform the hull cross sectional shape at depth B into a different cross sectional shape at the hull bottom. Wetted bottom nosepiece 20 initiates bottom cavity 18, and wetted bottom tailpiece 24 smoothly closes the bottom cavity.

FIG. 11, sections a–d, shows horizontal cross sections of hull 10A, and section e is a bottom view of hull 10A that excludes wetted region 88 and above. Section a is the cross section at water line 12; steps 87 lie just inside cavity 14. Section b is the cross section at depth A in FIG. 10 showing steps 87 that now form three cavities 14a, b, n. Section c is taken just above depth B, showing three cavities 14a, b, n. Section d is taken just below depth B, showing that the side cavities have disappeared. Bottom view e in FIG. 11 covers the region up to new wetted region 88, shown in FIG. 10, showing bottom cavity 18, wetted bottom nosepiece 20 that starts the bottom cavity, and wetted bottom tailpiece 24 that closes the bottom cavity.

FIG. 12A includes a copy of a half hull section c in FIG. 11, and additionally shows new cavities that result from changes in speed, depth and nosepiece angle. Side nosepiece 16 starts the first cavity 14a that closes smoothly at step 87 that starts a second cavity 14b, and so on. Relative to the design case, at either some higher speed than design speed, or some lesser depth, cavity 14a will enlarge to new cavity 15 that closes smoothly on tailpiece 22. Similarly, at either some lesser speed or some greater depth, cavity 14a will shorten to cavity 14A. In this case, cavity 14A can be lengthened to form new cavity 14B that closes in the desired region if the angle of nosepiece 16 is increased to new position 16A. Similarly, the angles of steps 87 can be increased at lower speeds or greater depths to lengthen the otherwise-shortened cavities.

Alternatively, in a new hull design case, cavity 15 in FIG. 12A could be considered as the design cavity where steps 87 now lie inside design cavity 15. In this new case, cavities 14a, b, n will form at a reduced speed or a greater depth, which tends to maximize cavity coverage under this off-design case. At a still-lower speed, or a still-greater depth, the nosepiece and step angles can be deflected outward, to maintain closure of the three cavities in the desired regions.

FIG. 12B illustrates similar methods to maximize bottom cavities by using multiple cavities, and nosepiece and step angle changes, to maximize cavity coverage under off-design conditions. In the design case, bottom nosepiece 20 and steps 87 form design cavities 18a, 18b and 18n on bottom 89 that respectively extend back to first step 87, second step 87 and tailpiece 24. At either some higher speed, or some lesser depth, longer cavity 19 will form behind nosepiece 20 that closes smoothly on tailpiece 24. At some lesser speed or some greater depth, cavities 18a, 18b and 18n shrink greatly in size; however, nosepiece 20 and steps 87 can be deflected outward to new positions, as discussed in connection with FIG. 12A, so that the three cavities close near their design locations. Alternatively, in a totally different hull design case, cavity 19 could be the design cavity; at some lower speed or some greater depth, cavity 19 will be replaced by cavities 18a, 18b and 18n, which together maximize cavity coverage under this off-design condition. At a still-lower speed, or a still-greater depth, the nosepiece and step angles can be deflected outward, as in the first case, to maintain closure in the desired regions.

In summary, by using design techniques described herein, hull surface shapes and step angles can be designed as a function of speed and depth to optimize cavity shapes within reasonable limits. Control system 31 shown in FIG. 10 can provide the necessary automatic or manual means to adjust nosepiece and step angles.

FIGS. 13A–13C are respective front, side and bottom views of new low drag hulls 10B of the present invention that add a new, closed upper bottom air cavity 90 to the low drag hull 10 designs discussed previously, to form a lower hull 91. Upper bottom nosepiece 92 initiates upper bottom cavity 90. Upper bottom cavity 90 is closed by upper bottom tailpiece 94. Fences 93 may be used to better separate upper cavities 90 from lower cavities 18 in some design cases. This hull modification is otherwise similar to low drag hull 10 shown in FIGS. 1–3. The pressure in the upper bottom cavity 90 is preferably at atmospheric pressure so that this cavity can merge with side cavities 14 to form a single overall cavity at atmospheric pressure.

An important option for this new invention is to place fence 95, or an equivalent wetted region, between side cavity 14 and upper bottom cavity 90 so that the pressure in cavity 90 can be increased above atmospheric. As discussed in connection with FIGS. 12A and 12B, cavity shapes can be kept fairly constant by adjusting depth as a function of speed. Additionally, cavity shapes can be further controlled within limits by adjusting pressures and/or airflow rates in the upper 90 and lower 18 bottom cavities to maximize cavity coverage. Control system 31 provides the necessary manual or automatic control to maximize cavity coverage.

FIGS. 14a–14f show alternative planform lower hull bottom shapes for low drag hulls of the type shown in FIGS. 11–13. Although not shown, these bottom shapes include bottom cavity 18, wetted bottom nosepiece 20 and wetted bottom tailpiece 24. The outer surfaces of the hull in shape b can be wetted to help isolate an upper bottom cavity from a bottom cavity. Bottom shape c is shown with a triangular nose; the included angle at the nose may vary from 20 degrees to 180 degrees. Bottom shapes c–f can provide dynamic stability in pitch without the need for stabilizing fins. Control surfaces in the lower hull, such as flaps 96 or equivalent transverse plates, are placed in the aft regions of the hulls to provide dynamic control in pitch, heave and roll. The flaps can also serve to control the upper and lower bottom cavity shapes.

FIG. 15 shows plan views of a canard 28 and a stabilizing fin 26 that include air cavities 97 and 98, respectively, on each side of the fins to reduce hydrofoil frictional drag. The shaded regions 100, 102 designate wetted areas. The wetted area at the base of either fin can be eliminated if the fin is attached to a wetted region on a hull. Optionally, these fins can be fully wetted.

FIGS. 16a and 16b show front views of alternative low drag hulls that have an upper bottom cavity 90 and a bottom cavity 18. Also shown in each of these figures is a fence 104 that separates side cavity 14 from upper bottom cavity 90 if their pressures are different, or if the airflow rate into cavity 90 is to be controlled.

FIG. 17 is a side view of a new low drag hull 10C where the hull that lies above upper bottom cavity 90 is divided into a forward low drag hull 106 spaced ahead of an aft low drag hull 108. The wetted areas at design speed are shaded. The advantages include further reductions in vessel drag and weight, and motion in waves. Fences 105 separate side cavities 14 in hulls 106 and 108 from the upper bottom cavity 90. Wave making drag can be significantly reduced by proper shaping of the lower hull including cavities 90 and 18, and the fore and aft hulls 106, 108, such that surface waves formed by individual hulls tend to cancel each other; this wave cancellation technique is well-known in SWATH ships. It is noted that similar wave cancellation can be accomplished for other types of low drag hulls presented herein.

It is also noted that the pressure difference between bottom cavity 18 and upper bottom cavity 90 provides a means to control dynamic lift within limits. By changing lift, hull depth is controlled as a function of speed to maintain cavity shapes close to the design shapes, which is an important feature. One way to change this pressure differential is to deflect an aft portion of the lower hull 91, such as control surface 96 in FIG. 14. Lift can also be changed by using fore and aft fins, and/or by adding a center hydrofoil. The fins provide the option for increasing stability, and providing motion control.

A variety of propulsors 114 can be used, including a wetted propeller, superventilated propeller, base vented propeller, pumpjet, water jet, or low drag propeller with a closed cavity on each side, such as described in Lang U.S. Pat. Nos. 6,167,829 and 6,439,148.

FIGS. 18A and 18B are respective side and front views of a low drag hull 10D designed for low volumetric Froude numbers, Fv. Hull 10D differs from hull 10 in FIGS. 1 to 3 by having many more steps 130 that form side cavities 134 as depth increases, starting with single side cavity 126 that extends down to depth d. This preferred version of this low-Fv hull has side cavities at atmospheric pressure. Wetted nosepiece 16 initiates the first cavity at all depths, and wetted tailpiece 22 closes the last side cavity at depths below where the side cavities first close on the hull. Two bottom cavities 18 are shown in FIG. 18A.

FIG. 18B is a front view of low-Fv hull 116 which more-closely resembles a conventional ship hull than low drag hulls designed for moderate and high Fv. Consequently, these low Fv hull shapes are applicable as monohulls, in addition to multi-hulled vessels. Front view shapes can vary. In any case, the net lift exerted on the hull by the cavities and on any wetted surfaces by the water, should approximately equal the displacement of the hull and cavity. Although not shown, stabilizing fins are optionally added, but are not needed on low-Fv hulls.

FIG. 19 shows horizontal cross sections a–f corresponding to depths a–f shown in FIG. 18A. Bottom cross-section f also includes a bottom view; the region between bottom cavities 18 and the outer profile of hull bottom 124 is wetted, and is shown as shaded. Note that depths a and b are taken close to the waterline, and side cavity 126 is open. At depth c, the side cavity closes on the hull, and tailpiece 128 is fully wetted. In sections a–c, the center step of steps 130 lies just within cavity 126; this placement permits a new second cavity to start at depths down to c in case cavity 126 contacts the hull ahead of this step, such as under off-design conditions. Below depth c, steps 130 are designed to both close the preceding cavity and start the next cavity. The underlying hull shape 131 in each of the sections is streamlined, except for the steps, and resembles some conventional hull shapes. In all sections, the first side cavity is initiated by nosepiece 16. Note that all side cavities 134 are part of cavity 126, and are at atmospheric pressure. Also note that four closed side cavities 134 are shown in section d, ten in section e, and seventeen in section f. These side cavity numbers can vary; more cavities tend to reduce cavity closure losses, but increase wetted area. In bottom section f, two bottom cavities 18 are shown. Bottom nosepiece 20 opens the forward bottom cavity, step 132 closes the forward bottom cavity and starts the aft bottom cavity, and bottom tailpiece 24 closes the aft bottom cavity. The number of bottom cavities can vary from none to many; however, the case with no bottom cavity significantly increases drag. Note that the shapes of hull cross-sections, steps and cavities all vary with depth. Many variations in step numbers and locations, and in hull shapes and cavity shapes are possible, and may be feasible in different design situations.

Conventional ships are shaped somewhat like the hull shown in FIGS. 18A and 18B, and have hull sections somewhat like those shown in FIGS. 19a to 19f. Accordingly, steps 130 can be added to the sides of an existing hull, and air can be pumped at atmospheric pressure behind these steps. Similarly, wetted bottom nosepieces 20, step 132 and wetted tailpiece 24 can be added to the bottom of the hull, and pressurized air can be pumped behind nosepiece 20 and optional steps 132 to form one or more bottom cavities. If not already there, fences 124 can be added at the side/bottom intersection to separate side and bottom cavities. Various ways of introducing and controlling airflow rates into the different cavities can be used.

In FIG. 20A, sections a and b are bottom views of low drag hulls with different bottom cavity options that augment those shown previously. Bottom fence 136 and step 33 in section a together form four separate bottom cavities 18. The fence 136 and step 33 help retain good cavity coverage under off-design conditions. Additionally, the pressure in these cavities 18 can be individually varied to provide limited control over vessel pitch, roll and heave, and to help compensate for pressure changes on the bottom when turning. Section b shows how multiple steps 33 and bottom fences 136 can be used to form eight bottom cavities 18. The number and position of cavities can be altered according to design needs.

FIG. 20B shows a typical planing boat with fences 133 and 135 added to a vee bottom boat, approximately parallel to the water surface when planing. Pressurized air is introduced between fences 133 and 135, just behind wetted bottom nosepiece 129 to form an upper bottom air cavity 137 to reduce drag. Air at a higher pressure is introduced below fence 135 and just behind wetted bottom nosepiece 129 to form a lower bottom air cavity 139 to further reduce drag.

FIG. 21 is a side view of a new low drag hull 10E that includes horizontal fences 142 starting at depth d, above which hull and cavity shapes are identical to those shown in FIG. 18A. Each fence 142 must extend outward beyond cavities 134 on each side to separate cavities, because cavity pressure increases below each fence. Steps 144 first contact the side cavity just below depth c where side cavity 134 closes on the hull. It is noted that low drag hull 10E can be designed for most values of Fv. Fewer fences and steps are needed as the design Fv increases. Compressed air is supplied at the appropriate pressure to each side cavity 14 below depth d by control system 31, which includes means to deliver compressed air to cavities below depth d in addition to means to control cavity pressures and airflow rates, which may be done as a function of speed, depth and other variables.

FIGS. 22A and 22B are horizontal cross sections taken at depths d− and z+, respectively. As shown in FIG. 21, depth z lies midway between depths d and e. FIG. 22A shows section d−, which is taken just below fence 142 at depth d. FIG. 22B shows section z+, which is taken just above fence 142 at depth z. All hull and cavity shapes between equally-spaced pairs of fences from depth z down to the hull bottom can be made to approximate those between depths d and z by using the same fence spacing and the same difference between cavity pressure and depth pressure at each corresponding fence. Note that hull surfaces 146 are streamlined, except for nosepiece step 145, and for steps 144 that are designed to close a preceding cavity and open a new cavity. A typical step 144 is shown in the enlarged sectional view in FIG. 22C.

FIG. 23 shows another new low drag hull 10F that reduces wavemaking drag. This important new invention is most applicable for hulls designed for moderate to high Fv where wavemaking drag is significant. Nosepiece 16 initiates side cavities, and tailpiece 22 closes the side cavities. Upper cavity 162 is open to the atmosphere. Horizontal fences 142 at depths A and B separate side cavities into three vertical layers to form cavities 162, 164, and 166 whose pressures increase with depth. Wetted region 152 separates lower layer of side cavities 166 from bottom cavities 154 which are initiated by bottom nosepieces 156, and closed by bottom tailpieces 158. The bottom nosepieces 156 and tailpiece 158 augment region 152 in isolating bottom cavities from side cavities. Step 160 lies just inside upper cavities 162 and 164, and is used to initiate a new cavity in case water contacts the hull ahead of this step, such as when operating under off-design conditions. Angled steps 150 form three side cavities 164 between depths A and B, and form three more side cavities 166 between depths B and C. The pressures in each cavity between each pair of fences are preferably about the same.

Figure 24:
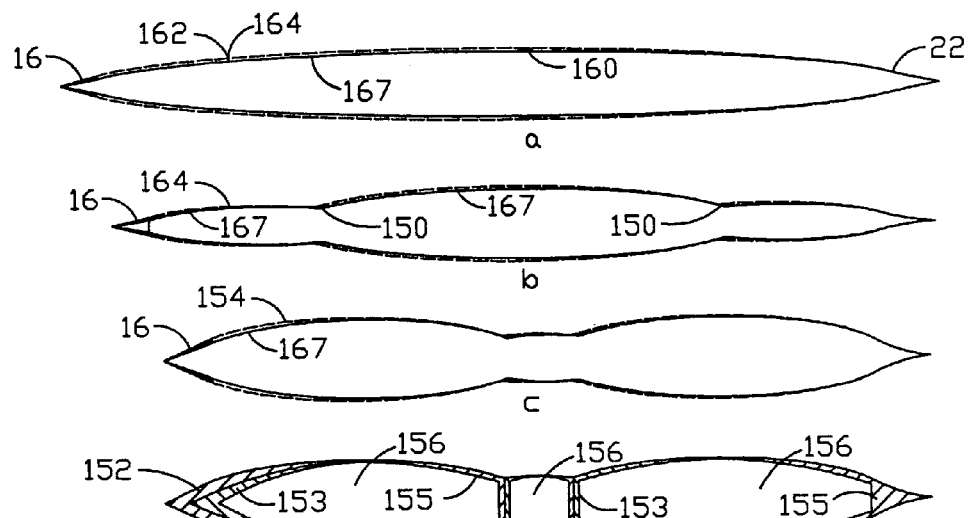

FIG. 24 includes cross sections a–c taken at corresponding depths A, B and C shown in FIG. 23. Hull shape 167 at each depth is designed to lie just within each cavity. The large differences in cavity shapes seen in sections a–c are made possible by fences 142 and steps 150. This large difference in cavity sizes and shapes between the two lower air layers is designed to minimize wavemaking drag. Wavemaking drag is reduced if waves generated by one layer interact with waves generated by an adjacent layer in such a way that each set of waves tends to cancel the other set of waves. Although much different physically, this interaction somewhat resembles the well-known "coke-bottle" effect used in high-speed aircraft design where the fuselage necks down in the vicinity of the wing, thereby tending to keep each longitudinal cross sectional area roughly constant. Computational fluid dynamic (CFD) programs can be used to find the detailed shapes of hull/cavity sections needed to minimize wavemaking drag. Alternatively, model tests can be used to develop these detailed shapes. It is noted that any change in design Froude number, hull length, draft, and front profile, etc., will result in a different shape that minimizes wavemaking drag. In any case, the general design ideas described here provide hulls needed to reduce wavemaking drag.

In addition to changes in cavity-shapes between layers, cavity shapes change with depth within each layer in accordance with cavity physics. Therefore nosepiece 16, tailpiece 22, and steps 150, will change shape with depth. Each fence must extend beyond the cavity on each side in order to separate cavities.

FIG. 24d is a bottom view of hull 148 that shows the hull up to depth C. Wetted region 152, together with bottom nosepieces 153 and bottom tailpieces 155 separate the lower side cavities from the three bottom cavities 156.

FIG. 25 shows a new low drag hull 10G that illustrates still another way to reduce wavemaking drag. This hull is similar to that shown in FIG. 23, except all side fences are removed. Cavity 162 is open to the atmosphere. Step 160 lies just under cavity 162. Steps 150 separate cavities 172 and 174 from cavity 162. The pressures within cavities 172 and 174 determine cavity shapes within each cavity. As noted earlier, nosepiece, step and cavity shapes change with cavity pressure and depth. By proper design of the variables, cavity shapes can be generated that will significantly reduce wavemaking drag. The resulting cavity shapes will be similar to those shown in sections b and c in FIG. 24 at depths B and C in FIG. 23. Without fences, there is not as much design control over cavity shapes, sizes and positions, and hull beam, but the design is simpler.

In FIG. 26, sections a and b are cross sections corresponding to depths B and C, respectively, in FIG. 25, which are designed to minimize wavemaking drag. Cavities 162, 172 and 174 can be at different pressures, as described above for FIG. 25. Alternatively, for simplicity; cavities 172 and 174 can be designed for atmospheric pressure. For even greater simplicity, either cavity 172 or cavity 174 can be eliminated, and cavity sizes and pressures can be adjusted as needed to minimize wavemaking drag. In any case, if cavities 172 and 174 are at atmospheric pressure, then either air ducts can be installed to deliver air to the lower cavities, or short upper portions of steps 150 can be removed to permit air to enter these cavities.

FIG. 27 shows still another arrangement to reduce wavemaking drag. Hull nosepiece 16 and hull tailpiece 22 are angled down and outward from the hull, and angled steps 150 form cavities 172 and 174. Except for hull shape, the general design for reducing wavemaking drag remains the same as for the FIGS. 23–26. The objective of this new hull shape is to emphasize the wave canceling effects between the two lower cavities and the center cavity, in order to further reduce wavemaking drag. Also, the bottom area is increased which permits the pressure in the bottom cavity to reduce relative to depth pressure, which may be an advantage in some design cases.

FIGS. 28A and 28B show how side cavities can be enlarged, if desired, by using nosepieces that are larger and longer than usual in cross section, in order to open a wider cavity. For example, nosepiece 178 can be used to replace nosepiece 16, as shown in FIGS. 28A and 28B that relate to a hull section taken near the water surface. To minimize cavity drag, nosepiece 178 can have a region where its surface pressure is less than the pressure in the cavity that lies behind the nosepiece. It is noted that steps can be similarly enlarged to open larger side or bottom cavities.

By way of general comments, it is noted that, whenever a cavity is isolated, such as by fences or steps, it is possible to control cavity length to a limited extent by controlling airflow rate into the cavity. It is also noted that control system 31, such as that shown in FIG. 23 and others, is defined to include the entire air system and associated ducts, sensors and controls, together with all controls related to ship motion including sensors, wiring and so on. Finally, it is noted that most of the various low drag hulls described herein can also be used for non-propelled craft such as sailboats, surfboards, kayaks, and towed craft among others.

FIG. 29 shows a bottom view of hull 10 in FIG. 1, with low drag hydrofoil 176, such as described in Lang U.S. Pat. Nos. 6,167,829 and 6,439,148, placed near the center of gravity to help support the weight of the ship. Hydrofoil 176 is optionally movable fore and aft to adjust for changes in longitudinal center of gravity.

FIGS. 30A–30C are respective side, bottom and front views of a hydrofoil-assisted trimaran vessel 180 provided with three low drag hulls. Without cavities, this hull resembles that in Lang U.S. Pat. 3,730,123. Hydrofoil 182 is attached to a low drag lower hull 184, which is supported by a low drag center hull 185. Low drag side hulls 186 provide static stability in roll. Optional low drag tip fins 188 provide dynamic stability in pitch, add roll damping, and if controllable, can provide heave, pitch and roll control to augment or replace the stabilizing and control functions of fins 190 that are attached to lower hull 184. The pressure differential between lower cavity 192 and upper cavity 194 acting on lower hull 184, together with dynamic lift from hydrofoil 182, help support the weight of the ship. The at-rest waterline 196 lies above a design speed waterline 198 on trimaran 180. Weather deck 200 can range upward in size from the minimum needed to support side hulls 186. Propulsion options include low drag propeller 202. It is noted that all underwater components are preferably low drag shapes that have air cavities on each side.

FIGS. 31A and 31B are front views of an alternative version of the low drag trimaran shown in FIG. 30C. Low drag support fins 202 in FIG. 31A add support to lower hull 184 and increase pitch and yaw stability. These fins replace tip fins 188 and a lower portion of side hull 186 in FIG. 30C. Flaps, not shown, can be added to fins 202 to control vessel motion. Alternatively, side hulls 186 and fins 188 can be moved to the forward end of vessel 180, and the fins can be cambered in order to support a forward portion of the hull weight, and provide dynamic stability in heave, pitch and roll. FIG. 31B is a front view identical to FIG. 30C, except both sides of the lower hull are blended into the hydrofoil to reduce interference drag and provide a smoother transition form the lower hull to the hydrofoil.

FIGS. 32A–32C are respective side, front and bottom views of hydrofoil boat 210. Low drag hydrofoil 212, which may be swept either way, or unswept, is attached to low drag center hull 214 and to low drag side hulls 216 by means of three struts 218. Side hulls are attached to the center hull by means of supports 217. Bow height stabilization is provided by forward lifting means 220, one form of which is shown here as a surface-piercing hydrofoil, but which could optionally be another type of lifting means, including a different kind of hydrofoil, a planing surface, or a low drag hull. It is noted that low drag, as defined herein, is a submerged surface that is provided with one or more air cavities to reduce drag.

FIGS. 33A and 33B show how low drag ships 222 can be locked together at sea to form a floating platform. For example, individual ships 222 can transit at design speed, and then lock together to form either a temporary base, or a temporary floating airfield as shown in FIG. 33B.

FIGS. 34A, 34B and 34C are respective top, stem, and side views of a low drag submarine 230 that is similar to the lower hulls of low drag ships shown in FIGS. 13, 16 and 17, and which utilizes air cavities on each side for drag reduction. Nosepiece 232 starts cavities on the top and bottom surfaces of the submarine, and wetted tailpiece 234 closes the cavities. Portions or all of tailpiece 234 can be made adjustable, such as by using a flap, to control submarine depth, pitch angle and roll angle. Pressurized gas supply system 236 includes ducting 238 and 240 to supply gas to upper cavity 242 at a lower pressure, and supply gas to lower cavity 244 at a higher pressure. The gas outlets may be located either behind the nosepieces or in or under the nosepieces. A relatively constant pressure difference between the two cavities is needed to support the weight of the submarine. Dynamic lift can be used to adjust for small pressure differences. Drag reduction and gas shrouding combine to greatly reduce radiated noise.

Main pressure hull 246 and side hulls 248 house the crew and submarine systems, including the propulsion system. Many variations in design are possible, including the number of hulls and hull pressurization. Hatches 250 permit entry between the hulls. Conning tower 252 with a closed cavity on each side having the same cavity pressure as upper cavity 242 is preferred, but fence 254 may be used to separate the conning tower cavities from the upper hull cavity if different pressures are desired; many variations are possible, including elimination of the conning tower. Propeller 256, with closed cavities on blades is the preferred propulsive arrangement, but additional, wetted propellers, or alternative propulsors can be used. Vertical stabilizer 258 with closed cavities is preferred with cavity pressures the same as the adjacent upper or lower cavity; however, fences 260 can be used if different pressures are desired. Control is provided by an adjustable wetted tailpiece 262 that acts as a flap; alternative control means are possible, including an all-moveable stabilizer. Also, angled stabilizers, if desired, can replace the vertical stabilizers.

Cavity shapes and pressures will change when maneuvering, diving, climbing, or when operating near the surface in large waves. These changes can either be tolerated with an associated increase in drag, or the drag can be minimized by using cavity control or additional smaller cavities, as discussed elsewhere in this description.

A unique feature of this submarine invention is that cavity shape can be kept about constant, independent of depth and speed, by varying submarine speed with approximately the square root of depth. Normally, cavities become longer with increased speed and reduced depth, or shorter with reduced speed and increased depth. In this submarine invention, the cavity shapes and the underlying hull shapes are developed for a given design speed and depth. For example, if the design depth is $Z_o$ and design speed is $V_o$, then at ½ design depth, the corresponding best speed is around 0.71 $V_o$. Dynamic phenomena such as cavitation resistance will remain about constant. The nearness of the ocean surface, when operating at shallow depths, affects cavity shapes, especially the shape of the upper cavity.

FIG. 34D schematically shows a sonar array 264 which can be incorporated in nosepiece 232 and in tailpiece 234. The large sonar aperture enhances performance. Location in a laminar flow region in the nosepieces further enhances performance.

The profile of this submarine invention provides many advantages, even in a fully wetted condition without cavities. Consequently, a preferred version includes retractable steps such as those shown in FIG. 6 in order to minimize drag and radiated noise when operating fully wetted. Many other Profile shapes are feasible.

FIG. 35 shows a wing-in-ground-effect (WIG) vessel 270 that uses low drag hulls for operating at high speed in waves. Wing 272, low drag center hull 274 and low drag side hulls 276 support the weight of the vessel. The hulls have side and bottom cavities to reduce drag, as described herein. At a maximum design speed, the side hulls can be designed to clear the water to further reduce drag.

FIG. 36 shows a seaplane 280 that is lifted by wing 282 uses low drag hulls for landing and taking off from water. Center hull 284 and side hulls 286 have side and bottom cavities to reduce drag, as described herein. At a maximum waterborne speed, the side hulls can be designed to clear the water to further reduce drag.

FIG. 37 shows a low drag hull that is preferably streamlined in horizontal cross section behind a nosepiece that forms a closed cavity 290 to reduce drag at lower speeds, wherein said nosepiece forms an open cavity 292 on the hull sides at high speeds.

While the invention has been described with reference to specific embodiments, modifications and variations of the invention may be constructed without departing from the scope of the invention.

We claim:

1. Low drag hull apparatus, comprising a waterborne vessel having at least one vessel-supporting hull, a hull bottom on the hull, at least one side cavity on the hull, at least one bottom cavity on the hull bottom, a wetted bow nosepiece on the hull, a wetted bottom nosepiece on the hull bottom, and a wetted bottom tail region on the hull bottom, wherein the at least one side cavity opens at the wetted bow nosepiece for displacing water from a side portion of the hull adjacent the cavity, wherein at least one bottom cavity opens at the bottom nosepiece and at least a part of the at least one bottom cavity closes at the wetted bottom tail region for reducing drag on the hull, wherein the bottom nosepiece is swept-back along the bottom sides, resembling a vee in bottom view, to form the at least one bottom cavity and to separate a significant part of the one or more bottom cavities from adjacent side cavities, and wherein the bottom tail region may be swept forward near each side of the hull bottom to separate a significant part of the one or more bottom cavities from adjacent side cavities, and further comprising wetted regions or fences positioned between side and bottom cavities as needed to assist the bottom nosepiece and the bottom tail region in separating bottom cavities from side cavities.

2. The apparatus of claim 1, wherein the hull has opposite sides, and the at least one side cavity comprises side cavities on the opposite sides of the hull for opening at the wetted nosepiece and displacing water away from the opposite sides of the hull, further comprising a wetted side tailpiece and wherein at least part of the side cavities close at the wetted tailpiece.

3. The apparatus of claim 2, wherein the side cavities further comprise upper and lower portions, wherein the wetted tailpiece is positioned at a lower position of a stern of the hull, wherein the upper side cavity portions close beyond the stern, and wherein the lower side cavity portions close at the wetted tailpiece.

4. The apparatus of claim 1, further comprising at least one step extending across the hull bottom to close a preceding bottom cavity and an air outlet either in or following an after portion of the at least one step to open a following bottom cavity aft of the step by releasing pressurized air from the air outlet.

5. The apparatus of claim 4, further comprising an air intake near a forward portion of the at least one step or near a forward portion of the wetted bottom tail region to help close the preceding bottom cavity.

6. The apparatus of claim 2, further comprising one or more side steps located within the side cavities to initiate additional side cavities in case the outside water flow contacts a hull side under off design conditions, or further comprising one or more bottom steps located within the bottom cavities with associated air supplies to initiate additional bottom cavities in case the outside water flow contacts the hull bottom under off design conditions.

7. The apparatus of claim 1, wherein the pressure in a bottom cavity is less than depth pressure in order to help ensure a stable bottom cavity.

8. The apparatus of claim 1, wherein the lift on the bottom of the hull is approximately equal to the displacement of the cavities and the hull portions that lie above the bottom of the hull and ahead of the stern of the hull.

9. The apparatus of claim 1, wherein the design waterline lies lower on the hull than the at-rest waterline.

10. The apparatus of claim 1, further comprising at least one stabilizing fin mounted on the hull having a vertically-projected area and extending from the hull.

11. The apparatus of claim 10, further comprising at least one flap mounted on the at least one stabilizing fin.

12. The apparatus of claim 1, further comprising at least one canard fin, wherein at least one of the canard fins has upper and lower fin surfaces that may have an air cavity on at least one of the fin surfaces.

13. The apparatus of claim 2, wherein the vessel comprises two or more hulls.

14. The apparatus of claim 13, wherein two or more vessels are linked together as a platform.

15. The apparatus of claim 2, wherein the side cavities are filled with air at approximately atmospheric pressure.

16. The apparatus of claim 2, wherein lower side cavity portions have overall side-to-side cavity widths that increase with depth.

17. The apparatus of claim 2, wherein the hull surface lies a short distance inside the cavity portions near the bow or bottom nosepieces, said short distance reducing or increasing somewhat, and then reducing to zero for cavities that close on the hull.

18. The apparatus of claim 2, wherein the hull sides are relatively streamlined in horizontal cross section.

19. The apparatus of claim 2, wherein one or more steps lie just under the cavities in order to start new cavities in case the outside water flow contacts the steps under off design conditions.

20. The apparatus of claim 2, wherein the hull has side steps spaced along the opposite sides for forming plural side cavities along the opposite sides of the hull wherein one or more of the side cavities may be open to the atmosphere.

21. The apparatus of claim 20, wherein the side steps are either outward formed on the hull sides or inward formed in the sides.

22. The apparatus of claim 20, wherein the side steps are angled to the vertical along the hull.

23. The apparatus of claim 20, wherein cavities near the center of the hull are largest toward the top of the hull, and cavities near the ends of the hull are largest toward the bottom of the hull, thereby reducing wavemaking drag or reducing overall beam.

24. The apparatus of claim 20, wherein the side steps increase in number as the hull bottom is approached.

25. The apparatus of claim 24, wherein the side steps have varied heights, and wherein the steps that begin at the lesser depths have the greater heights.

26. The apparatus of claim 25, wherein the side steps have alternating longer and shorter lengths from a bottom of the vessel for forming additional side cavities near the bottom of the hull.

27. The apparatus of claim 20, wherein at least one side step has an air outlet for assisting in opening new side cavities.

28. The apparatus of claim 20, wherein at least one side step has an air intake for assisting in closing a previous side cavity.

29. The apparatus of claim 1, further comprising fore and aft ballast or fuel tanks in the hull, means to move ballast or fuel between fore and aft tanks, and means to increase or reduce the amount of ballast in the ballast tanks, to help control vessel weight or center of gravity.

30. The apparatus of claim 2, wherein at least a portion of the nosepiece may be swept either way from vertical and may comprise one or more of many different kinds of cross sectional shapes that may change in shape from the top to the bottom of the nosepiece, wherein the shapes have surface changes in a rearward direction that cause the water flow to separate from the nosepiece on opposite sides, and wherein the surface changes may be obtuse angles, increased convex curvatures, steps and notches, and wherein the nosepiece may be a wedge shape with flat sides, convex sides or concave sides, and wherein the nosepiece could be a flat transverse plate.

31. The apparatus of claim 30, wherein the nosepiece has extendable and retractable elements on opposite sides, and wherein the extendable and retractable elements are transverse plates, curved flexible plates, flat rigid plates, extendable supports for the nosepiece, hinged plates, inflatable tubes, slidable bars, and rotatable curved transverse plates, and wherein the amount of extension or retraction may vary along the nosepiece length.

32. The apparatus of claim 2, wherein at least a portion of the nosepiece further comprises a flat forward surface whose width is optionally controllable.

33. The apparatus of claim 2, wherein the nosepiece further comprises at least one attachable strip.

34. The apparatus of claim 33, wherein the attachable strips are attached to either low drag hulls or conventional hulls.

35. The apparatus of claim 2, further comprising attachable steps attachable along sides of either low drag hulls or conventional hulls.

36. The apparatus of claim 2, further comprising a propulsor positioned near a wetted side tailpiece or a wetted bottom region, the propulsor further comprising a propeller and rudder, or a pump with an inlet in the wetted side tailpiece or bottom region, and having a steerable water jet.

37. The apparatus of claim 2, wherein the side cavities comprise one or more open side cavities that cover a stern region of the hull at or near the water line, one or more closed cavities below the open side cavities, additional closed cavities on each side below the one or more closed cavities, and optionally even more additional closed cavities below each of the additional closed cavities, and wherein the side cavities are mismatched vertically and horizontally to minimize wavemaking drag.

38. The apparatus of claim 2, further comprising at least one fence in a fore and aft direction for separating the at least one bottom cavity into separate port and starboard bottom cavities.

39. The apparatus of claim 38, wherein at least one step extends across each bottom cavity, including injecting pressurized air at or behind each step to form at least four separate bottom cavities.

40. The apparatus of claim 39, further comprising means to vary the cavity pressure or airflow rate within each of the at least four bottom cavities to maintain good cavity coverage under off-design conditions or to provide limited control over hull pitch, heave or roll.

41. The apparatus of claim 2, further comprising one or more approximately-parallel fences on the sides of the hull in the at least part of the side cavities which close at the wetted tail piece for separating the side cavities into plural layers of side cavities.

42. The apparatus of claim 41, further comprising steps on the hull for creating multiple fore and aft cavities within each cavity layer.

43. The apparatus of claim 42, wherein the pressure within each cavity layer increases with depth.

44. The apparatus of claim 41, including means to provide pressurized air to each side cavity below the upper fence, further including means to control the airflow rate or air pressure into each pressurized cavity as a function of hull speed, depth or other variables.

45. The apparatus of claim 2, wherein hull shapes are relatively streamlined in horizontal cross sections except for nosepiece protuberances and step protuberances, and wherein the side cavities are mismatched vertically and horizontally to minimize wavemaking drag.

46. A vessel comprising: a navigation deck; passenger or cargo compartments; a propulsion system; one or more low drag hulls, each hull having opposite sides and a bottom; one or more side cavities on each side of the one or more low drag hulls; a wetted bow nosepiece for starting the one or more side cavities; a wetted side tailpiece for closing at least a portion of the one or more side cavities; wherein the hull and cavities together provide a transverse cross section that resembles an hour glass which may have unequal top and bottom widths; and wherein at least most of the cavities in the lower part of the hour glass-like cross section comprise closed side cavities.

47. The vessel of claim 46, wherein the cavities cover up to about 90% of a below water line area of the vessel.

48. The vessel of claim 46, further comprising a wetted stern tailpiece for closing at least a portion of the one or more side cavities.

49. The vessel of claim 46, further comprising one or more bottom cavities on the one or more low drag hulls; a wetted bottom nosepiece for starting the one or more bottom cavities; a wetted bottom tail region for closing the one or more bottom cavities; and edge fences or wetted regions as needed for assisting the bottom nosepiece and the wetted bottom region for dividing the one or more bottom cavities from the one or more side cavities on the one or more low drag hulls.

50. The vessel of claim 46, further comprising at least one stabilizing fin having a vertically-projected area extending from the one or more low drag hulls.

51. The vessel of claim 50, further comprising fin cavities on at least one surface of the at least one stabilizing fin to reduce drag.

52. The vessel of claim 50, wherein the at least one stabilizing fin comprises more than one stabilizing fin on one or more sides of the one or more low drag hulls.

53. The vessel of claim 52, further comprising closed cavities on opposite surfaces of the stabilizing fins.

54. The vessel of claim 50, further comprising control surfaces on the stabilizing fins or other means to control the fins.

55. The vessel of claim 46, further comprising one or more canard fins having a vertically-projected area extending from submerged forward portions of the hulls.

56. The vessel of claim 46, further comprising a bow impact alleviator hull.

57. The vessel of claim 46, wherein the side cavities are at atmospheric pressure.

58. The vessel of claim 46, wherein the side cavities are open near the water surface, and closed elsewhere.

59. The vessel of claim 46, further comprising controls mounted on the one or more hulls for controlling one or more of pitch angle, altitude, direction and depth of the hulls.

60. The vessel of claim 46, further comprising one or more steps along the sides for opening and closing and for separating cavities along sides of the one or more hulls.

61. The vessel of claim 46, wherein at least a portion of the wetted bow nosepiece for initiating side cavities is wedge shaped.

62. The vessel of claim 46, wherein at least a portion of the wetted bow nosepiece for initiating side cavities has rearward increases in surface curvature to separate the water flow and start a cavity.

63. The vessel of claim 46, wherein at least a portion of the wetted bow nosepiece for initiating side cavities has steps for separating water flow and/or ducts for flowing air into the side cavities.

64. The vessel of claim 46, wherein at least a portion of the wetted bow nosepiece for initiating side cavities has a combination step and notch.

65. The vessel of claim 46, wherein at least a portion of the wetted bow nosepiece for initiating side cavities has a convex lateral bow surface.

66. The vessel of claim 46, wherein at least a portion of the wetted bow nosepiece for initiating side cavities has a concave lateral surface.

67. The vessel of claim 46, wherein at least a portion of the wetted bow nosepiece for initiating side cavities is flat.

68. The vessel of claim 46, wherein at least a portion of the wetted bow nosepiece for initiating side cavities is retractable.

69. The vessel of claim 46, wherein a bottom nosepiece and one or more a spaced bottom steps are used as cavity initiators to initiate bottom cavities.

70. The apparatus of claim 3, wherein at least one approximately horizontal fence is placed in the lower side cavity portions on each side, and the airflow rates into side cavities below the at least one fence are controlled.

71. Low drag hull apparatus, comprising a waterborne vessel having at least one vessel-supporting hull, an open side cavity on each side of the hull at approximately atmospheric pressure, a wetted nosepiece on the hull, and a hull bottom, wherein the side cavity opens at the wetted nosepiece for displacing water from a side portion of the hull adjacent the cavity, wherein the hull bottom is convex in a longitudinal cross section and in a transverse cross section, and wherein at least a majority of the hull bottom is at a pressure greater than atmospheric pressure and less than depth pressure.

72. The apparatus of claim 71, wherein the vessel is a monohull.

73. The apparatus of claim 72, wherein the majority of the hull volume lies below the waterline.

74. The apparatus of claim 71, wherein the vessel is a catamaran or a trimaran, wherein the at least one vessel-supporting hull comprises a center hull or each of two side hulls.

75. The apparatus of claim 2, wherein the side of at least a portion of a nosepiece is moved outward to form a larger cavity.

76. The apparatus of claim 4, further comprising one or more underlying bottom steps that lie under design bottom cavities that form at design speed, and wherein under an off-design condition, a new bottom cavity is formed behind at least one underlying bottom step.

77. The apparatus of claim 4, wherein the bottom nosepiece or one or more bottom steps are moved outward to form larger cavities.

78. The apparatus of claim 2, further comprising one or more spaced approximately parallel fences on the sides of the hull for separating each of the side cavities into plural layers of side cavities, further comprising steps on the hull for creating multiple fore and aft cavities within each cavity layer, wherein the upper layers of cavities comprise either large center cavities and small end cavities, or small center cavities and large end cavities, or combinations thereof, and the lower layers of cavities comprise either small center cavities and large end cavities or large center cavities and small end cavities, or combinations thereof, wherein the mismatch between cavity sizes in the upper and lower layers reduces wavemaking drag.

79. The apparatus of claim 78, further comprising large center cavities and small end cavities above an upper fence, and small center cavities and large end cavities below a lower fence, a forward step that angles down and back from a region near the front end of the upper fence to a region near the center of the hull bottom, further comprising an aft step that angles upward and rearward from a region near the lower end of the forward step to a region near the aft end of the upper fence, and wherein a side cavity below each fence may be pressurized.

80. The apparatus of claim 2, further comprising either a forward step that angles down and back from a region near the nosepiece to a region near the hull bottom, or an aft step that angles down and forward from a wetted stern region near the stern of the hull to a region near the hull bottom, wherein the nosepiece, step and wetted stern region are designed to form upper and lower side cavities that are mismatched to reduce wavemaking drag.

81. The apparatus of claim 80, wherein all side cavities are at atmospheric pressure.

82. The apparatus of claim 80, wherein at least a portion of the hull nosepiece is angled down and forward from the water surface, or at least a portion of the hull stern is angled down and rearward from the water surface.

83. The apparatus of claim 80, wherein both the forward step and an aft step angle down to a middle region of the hull bottom.

84. The apparatus of claim 2, wherein the nosepiece is enlarged in order to open wide side cavities, and wherein a cross section of the nosepiece resembles a cutoff hydrofoil nose section.

85. The apparatus of claim 2, wherein the pressure on at least a portion of the wetted nosepiece is less than the pressure in the cavity that lies behind the nosepiece.

86. The apparatus of claim 2, further comprising grooves or ridges attached to the hull that start inside each side cavity upstream of a design cavity closure location, and end either near or aft of the design cavity closure location, and that are approximately aligned in the direction of the local cavity wall water flow wherein energy is saved at cavity closure because the grooves reduce forward splash at cavity closure.

87. The apparatus of claim 86, wherein the grooves or ridges are placed near the wetted bottom tail region or a wetted region on the hull sides.

88. The apparatus of claim 86, wherein the grooves or ridges are placed near steps on the sides or near the end of the one or more bottom cavities.

89. Low drag hull apparatus, comprising a waterborne vessel having at least one vessel-supporting hull, at least one side cavity on each side of the hull, a wetted nosepiece on the hull, wherein at least one side cavity opens at the wetted nosepiece for displacing water from each side of the hull adjacent the cavity for reducing drag on the hull, further comprising a hull bottom, at least one bottom cavity on the hull bottom, a sweptback bottom nosepiece to open at least one bottom cavity, a wetted bottom tail region to close at least a part of one bottom cavity, wherein the sweptback bottom nosepiece separates a significant part of one or more bottom cavities from one or more side cavities, and additionally comprising a dynamic lifting surface connected to the hull.

90. The apparatus of claim 89, wherein the vessel is an aircraft, the dynamic lifting surface is a wing, and wherein after takeoff the hull bottom supports no portion of the weight of the vessel.

91. The apparatus of claim 89, wherein the vessel is a WIG, and the dynamic lifting surface connected to the hull is a ground effect wing.

92. The apparatus of claim 89, wherein the vessel is a ship, and the dynamic lifting surface is at least one hydrofoil.

93. The apparatus of claim 92, wherein the vessel is a catamaran ship, the at least one hull comprises parallel catamaran hulls, and the at least one hydrofoil may extend between the catamaran hulls.

94. The apparatus of claim 89, wherein the at least one hull comprises a main hull of a trimaran, wherein the two auxiliary hulls may have nosepieces for opening auxiliary hull cavities.

95. Submarine apparatus comprising at least one hull having non-circular cross sections whose beams are greater then their heights having a bow and a stern, a wetted nosepiece extending rearward or sideward from the bow and a wetted tailpiece that comprises a wetted tail region that extends forward or sideward from the stern, upper and lower gas cavities between the nosepiece and the tailpiece and respectively above and below the hull, wherein the wetted nosepiece and the wetted tailpiece separate at least a significant part of the upper and lower gas cavities, further comprising wetted regions or fences for assisting the wetted nosepieces and tailpieces in fully separating the upper and lower cavities as needed.

96. The apparatus of claim 95, further comprising one or more pressurized gas sources in the hull and conduits from the sources to the cavities for supplying the upper cavity with gas at a first pressure and supplying the lower cavity with gas at a second, higher pressure and maintaining a pressure differential between the cavities.

97. The apparatus of claim 95 further comprising at least one stabilizer with either a horizontally-projected area or a vertically-projected area extending from the hull.

98. The apparatus of claim 95 further comprising at least one control connected to the submarine for controlling the submarine.

99. The apparatus of claim 98 wherein the control comprises at least one flap that connected to or including at least a part of the tailpiece, the nosepiece or the at least one stabilizer.

100. The apparatus of claim 98 wherein the control comprises a movable tailpiece, a movable nosepiece or at least one moveable stabilizer.

101. The apparatus of claim 95, wherein the hull comprises an internal main pressure hull or one or more pressure or non-pressure hulls.

102. The apparatus of claim 95, wherein the hull, the nosepiece and the tailpiece have a delta-like planform, narrow at the nosepiece and wide at the tailpiece.

103. The apparatus of claim 95 further comprising means to halt the gas flow into cavities and-smooth the water flow over the submarine surfaces in order to eliminate cavities for operating the submarine quietly or efficiently in a fully wetted condition without the cavities.

104. The apparatus of claim 95 further comprising a sonar array incorporated in the nosepiece, hull or tailpiece.

105. The apparatus of claim 10, wherein the vessel comprises two hulls, further comprising one or more dynamically-lifting hydrofoils, wherein at least one of the one or more hydrofoils may be attached between the two hulls near their bottoms.

106. The apparatus of claim 105, wherein the one or more hydrofoils has a cavity on at least one surface.

107. The apparatus of claim 105, further comprising at least one canard fin mounted on each hull.

108. The apparatus of claim 106, further comprising at least one fin, and wherein at least one of the one or more hydrofoils and the at least one fin has an air cavity on one or both surfaces to reduce drag.

109. The apparatus of claim 105, wherein the hydrofoil is movable fore and aft to adjust for changes in longitudinal center of gravity.

110. The apparatus of claim 92, wherein at least one hydrofoil is attached to the hull by means of one or more struts to lift the hull at least partly out of water at design speed.

111. The apparatus of claim 110, wherein the at least one hydrofoil is a low drag hydrofoil having a cavity on at least one surface to reduce drag, and may be either unswept or swept either way.

112. The apparatus of claim 110, further comprising a bow lifting means attached near the bow of the hull to provide bow height stabilization.

113. The apparatus of claim 110, wherein the low drag hull helps reduce drag during takeoff, and reduces the effects of wave impacts when the vessel travels in waves.

114. The vessel of claim 110, in which the vessel is a trimaran, further comprising low drag outer hulls to help support the at least one hydrofoil.

115. A method of water supported vessel operation comprising providing a waterborne vessel, providing at least one vessel-supporting hull, providing at least one side cavity on each side of the hull, providing a wetted bow nosepiece on the hull, and providing a wetted stern tailpiece on the hull, opening the at least one cavity at the wetted bow nosepiece, displacing water from a side portion of the hull adjacent the cavity, closing at least a part of the at least one cavity at the wetted stern tailpiece, and further comprising shaping the hull to form cavities wherein at least a portion of the hull and cavities together provide a transverse cross section that resembles an hour glass that has equal or unequal top and bottom widths, and reducing drag on the hull.

116. The method of claim 115, further comprising providing a hull bottom on the hull, providing at least one bottom air cavity on the hull bottom, providing a bottom nosepiece on the hull bottom for opening a bottom cavity, supplying pressurized air into the at least one bottom cavity behind or through the bottom nosepiece, and providing a wetted bottom tail region on the hull bottom, and closing at least a part of a bottom cavity at the wetted bottom tail region.

117. The method of claim 116, further comprising providing the bottom nosepiece with sweepback along the sides of the hull bottom having a vee-like shape in bottom view, optionally providing the wetted bottom tail region with forward sweep along the sides of the bottom, and providing wetted side regions or fences extending from the hull bottom for assisting the bottom nosepiece and the wetted bottom tail region in separating bottom cavities from side cavities.

118. The method of claim 116, further comprising extending at least one bottom step across the hull bottom, closing a preceding bottom cavity at the at least one bottom step, and opening a following bottom cavity aft of the at least one bottom step.

119. The method of claim 116, further comprising generating one or more additional side cavities in case the outside water flow would otherwise contact a hull side under off design conditions, or further comprising initiating one or more additional bottom cavities in case the outside water flow would otherwise contact the hull bottom under off design conditions.

120. The method of claim 116, further comprising providing pressure in at least one bottom cavity at less than depth pressure and helping ensure a stable bottom cavity.

121. The method of claim 115, further comprising providing at least one stabilizing fin having a vertically-projected area mounted on the hull and extending from the hull, wherein the at least one fin may or may not have a cavity on one or both sides to reduce drag.

122. The method of claim 121, further comprising providing at least one flap mounted on the at least one stabilizing fin.

123. The method of claim 115, further comprising providing at least one canard fin on the hull which may or may not have a cavity on one or both sides to reduce drag.

124. The method of claim 115, further comprising providing two or more hulls, and linking the hulls together.

125. The method of claim 115, further comprising providing side steps along the hull.

126. The method of claim 125, further comprising providing a cavity formed behind each side step, and providing a mismatch in side cavities by providing a center side cavity largest toward a top of the hull, and providing end cavities largest toward the bottom of the hull, reducing wavemaking drag, or reducing overall beam.

127. The method of claim 125, further comprising providing more side steps as the hull bottom is approached, providing more steps for a hull that operates at a low design volumetric Froude number, or providing more steps that underlie design cavities for retaining side-cavity coverage under off design conditions.

128. The method of claim 115, further comprising providing spaced approximately parallel fences on the sides of the hull, separating each of the side cavities into plural layers of side cavities, and optionally increasing pressure within each cavity layer with depth.

129. A vessel operating method, comprising providing a navigation deck, passenger or cargo compartments, providing a propulsion system, providing one or more low drag hulls, each hull having opposite sides and a bottom, providing one or more side cavities on the one or more low drag hulls, providing one or more bottom cavities on the one or more low drag hulls, providing a wetted bow nosepiece on the one or more hulls, starting the one or more side cavities at the bow nosepiece, providing a wetted swept-back bottom nosepiece having a vee-like shape in bottom view and whose leading edges lie near the sides of the hull bottom to form the at least one bottom cavity and to separate a significant part of the one or more bottom cavities from any adjacent side cavity, further comprising providing a wetted bottom tail region on the bottom of the hull to close the at least one bottom cavity wherein the wetted bottom tail region may be swept forward near each side of the hull bottom to separate a significant part of the one or more bottom cavities from any adjacent side cavity, providing edge fences or wetted regions to assist the bottom nosepiece in dividing the one or more bottom cavities from the one or more side cavities on the one or more low drag hulls, and further providing the at least one bottom cavity with air at greater than atmospheric pressure but at less than depth pressure outside the bottom cavity.

130. The method of claim 129, further comprising providing a wetted stern tailpiece and closing at least a portion of the one or more side cavities at the stern tailpiece.

131. The method of claim 130, further comprising providing longitudinal grooves or ridges attached to the hull that start inside at least one cavity upstream of a cavity closure location, and end at or aft of the design cavity closure location, and saving energy at the cavity closures by reducing forward splash at the cavity closures.

132. The method of claim 129, further comprising providing a dynamic lifting surface connected to the hull.

133. The method of claim 132, wherein the vessel comprises two hulls, further comprising providing at least one a hydrofoil that is attached to at least one hull near its bottom.

134. The method of claim 132, wherein the hull is a center hull of a trimaran vessel, and further comprising providing at least one hydrofoil that is attached to at least the center hull for supporting a part of the vessel weight.

135. A submarine operating method comprising providing an outer hull having a bow and a stern, providing a nosepiece at the bow that may extend rearward from the bow on each side of the hull and a tailpiece that may extend either forward or aft from the stern, providing upper and lower gas cavities between the nosepiece and the tailpiece and respectively above and below the hull, providing at least one pressurized gas source in the hull and conduits from the at least one source to the cavities, and supplying the upper cavity with gas at a first pressure and supplying the lower cavity with gas at a second, higher pressure and typically maintaining a pressure differential between the cavities.

136. The method of claim 135, further comprising providing one or more pressure hulls located inside the outer surface of the outer hull, and providing a floodable region between the outer hull and the one or more pressure hulls.

137. The method of claim 135, wherein the outer hull has a delta-like platform, narrow at the nosepiece and wide at the tailpiece.

138. The method of claim 135, wherein at least a part of the nosepiece or tailpiece is controllable.

139. The method of claim 135, wherein at least a part of the nosepiece comprises a flat plate in a longitudinal cross-section.

140. The method of claim 135, further providing at least one or more cavities on one or more sides of one or more of the following: a vertically-extending stabilizer, a horizontally-extending stabilizer, a conning tower, and propulsor blades.

141. The method of claim 135, wherein the nosepiece extends rearward over a majority of the length of the submarine.

142. The apparatus of claim 2, further comprising at least one hydrofoil having a vertical-projecting area connected to the hull and extending outward from the hull and providing dynamic lift to the hull when underway.

143. The apparatus of claim 142, the hull further comprising at least one stabilizing fin having a vertically-projected area extending outward from the at least one hull.

144. The apparatus of claim 142, wherein the hull further comprises catamaran hulls and wherein the at least one hydrofoil optionally extends between the catamaran hulls.

145. The apparatus of claim 2, further comprising at least one canard fin placed near the bow of the hull.

146. Low drag hull method, comprising providing a waterborne vessel having at least one vessel-supporting hull, providing at least one side cavity on each side of the hull, providing a wetted nosepiece on the hull, opening the side cavities at the wetted nosepiece, displacing water from each side of the hull adjacent the cavity, widening the nosepiece to widen the side cavities, and reducing the resulting added cavity drag by adding convexity to the sides of the widened nosepiece to reduce the surface pressure over a portion of the nosepiece below the local depth pressure and to reduce the outward angle of cavity walls at the end of the nosepiece with respect to the hull centerline.

147. The method of claim 146, further comprising shaping the wetted nosepiece to provide a region on the nosepiece where the pressure is less than the pressure in a cavity behind the nosepiece.

148. Low drag hull method, comprising providing a waterborne vessel having at least one vessel-supporting hull, providing a wetted nosepiece on the hull, opening side cavities at the wetted nosepiece, displacing water from each side of the hull adjacent the cavity, and further providing closed side cavities over at least a portion of the hull depth, wherein underwater hull transverse cross sections resemble an isosceles triangle with a base near the hull bottom and a cut-off upper tip near the design waterline.

149. The method of claim 148, wherein the overall width of the side cavities in a lower portion of the closed-cavity region near the hull bottom reduce in a downward direction.

150. The method of claim 148, further providing at least one bottom cavity on a bottom of the hull.

151. Low drag hull method, comprising providing a waterborne vessel having at least one vessel-supporting hull, providing a wetted swept-back nosepiece on a bottom of the hull, having a vee-like shape in bottom view, opening at least one bottom cavity at the wetted nosepiece having a pressure less than depth pressure, displacing water from the bottom of the hull, and further providing shaping and sizing the bottom of the hull to close at least one bottom cavity, wherein the bottom surface of the at least one bottom cavity is convex in any vertical longitudinal cross section and is convex in at least one portion of any transverse cross section, and wherein no lower cavity is constrained by a side keel.

152. The method of claim 151 further comprising providing side cavities over at least a portion of the hull depth wherein at least a portion of the side cavities are open.

153. The method of claim 152, where the hulls are relatively streamlined in horizontal cross sections.

154. The method of claim 152, wherein the displacement of a hull and its adjacent cavities approximately equals the weight supported by the hull.

155. The method of claim 115, further providing relatively streamlined hull shapes in at least most horizontal cross sections.

156. Low drag hull method, comprising providing a waterborne vessel having at least one low-drag vessel-supporting surface piercing hull that uses cavities to reduce hull drag, and that supports at least part of the weight of the vessel at some design speed, providing at least one side cavity on each side of the hull, providing a wetted nosepiece on the hull, opening the side cavities at the wetted nosepiece, displacing water from each side of the hull adjacent the cavity, and reducing drag on the hull, providing a hull bottom, and providing at least one dynamic lifting surface connected to the hull that supports part of the weight of the vessel at some design speed.

157. Low drag hull method, comprising providing a waterborne vessel having at least one vessel-supporting low-drag surface piercing hull that uses cavities to reduce hull drag at some design speed, providing a wetted nosepiece on the hull, opening the side cavities at the wetted nosepiece, displacing water from each side of the hull adjacent the cavity, and further providing at least one fin or at least one dynamically-lifting hydrofoil attached to the hull.

158. The method of claim 157 wherein the at least one fin on the hydrofoil is controllable.

159. The method of claim 157, further providing a propulsor having blades, and further providing a cavity on at least one side of either the at least one fin, the hydrofoil or the propulsor blades.

160. The method of claim 157, further providing a hull bottom with at least one bottom cavity.

161. Low drag hull method, comprising providing a waterborne vessel having at least one vessel-supporting hull that comprises an upper hull, providing a lower hull having an upper side and a lower side attached to a bottom of the upper hull, and further providing a wetted sweptback lower hull nosepiece on the lower hull having a vee-like shape in plan view that extends rearward from a bow on one or both sides for forming a cavity an the upper side or the lower side of the lower hull, wherein the lower hulls are non-circular or non-tandem, and provide mostly displacement lift or remain submerged at rest.

162. The method of claim 161, further comprising providing a wetted upper hull nosepiece on the upper hull, and providing one or more side cavities on each side of the upper hull, wherein the upper hull nosepiece is angled or not angled to the vertical.

163. The method of claim 161, further providing a cavity on each side of the lower hull, and further providing at least one stabilizing fin having a vertically-projected area attached near an end of either the lower hull or the upper hull.

164. The method of claim 162 wherein a centerline of the upper hull nosepiece lies in an approximately vertical plane.

165. The method of claim 161 further providing a wetted lower hull tailpiece closing a cavity on the upper side or the lower side of the lower hull.

166. The method of claim 161 further providing an open cavity on the lower side of the lower hull.

167. The method of claim 161 wherein the lower hull is a hydrofoil.

168. The method of claim 167 wherein the hydrofoil provides dynamic lift.

169. The method of claim 161 wherein the displacement of the lower and upper hulls and their associated cavities is approximately equal to the weight supported by the hull.

170. The method of claim 161 wherein the wetted lower hull nosepiece is approximately flat in a longitudinal cross-section.

171. The method of claim 161 further providing attaching two hulls together with a cross structure forming a catamaran, or attaching two side hulls to a low drag hull to form a trimaran.

172. The method of claim 162 wherein the at least one cavity comprises one or more upper cavities on the upper side of the lower hull, and further providing a fence or a wetted region between the one or more upper cavities and the side cavities if their pressures are different.

173. The method of claim 172, further providing a wetted lower hull tailpiece on the lower hull wherein the forming at least one cavity comprises providing upper and lower cavities on the lower hull that close at the wetted lower hull tailpiece wherein the lower hull nosepiece and tailpiece separate at least much of the upper and lower cavities, providing additional wetted regions or fences for further separating the upper and lower cavities on the lower hull as needed, and further providing a pressure difference between the upper cavities and lower cavities for producing an upward force at a design speed and at a design lower hull depth.

174. The method of claim 173, further providing for an off-design lower hull centerline depth that is approximately equal to the design lower hull centerline depth multiplied by the square root of the ratio of an off-design speed to the design speed.

175. The method of claim 162 further providing one or more upper cavities an on the lower hull having a pressure that is essentially the same as a pressure in an adjacent side cavity on the upper hull.

176. The method of claim 161, further providing at least one additional upper hull that is attached to the lower hull, wherein the upper hulls are spaced longitudinally apart.

177. The method of claim 176 wherein the at least one additional upper hull is wetted.

178. The method of claim 176, further comprising providing each upper hull with at least one cavity on each side.

179. The apparatus of claim 71, wherein the vessel is a catamaran or the at least one hull is the main hull of a trimaran.

180. Low drag hull method, comprising providing a waterborne vessel having at least one vessel-supporting hull having opposite sides, providing a wetted nosepiece on the hull, providing side cavities on the opposite sides of the hull, opening the side cavities at the wetted nosepiece, providing wetted side steps on the opposite sides behind the nosepiece wherein more side steps are provided in a lower region on each side than in an upper region, opening additional side cavities at the wetted side steps, and displacing water from each side of the hull adjacent each cavity.

181. The method of claim 180 wherein the side cavities are filled with air at approximately atmospheric pressure.

182. The method of claim 180, wherein the opening side cavities further comprise opening upper side cavities which further comprise larger center cavities and smaller end cavities, and opening lower side cavities which further comprise smaller center cavities and larger end cavities, and wherein mismatches between the upper and lower side cavities reduce wavemaking drag.

183. The method of claim 180, wherein the opening side cavities further comprise opening upper side cavities which further comprise smaller center cavities and larger end cavities, and opening lower side cavities which further comprise larger center cavities and smaller end cavities, and wherein mismatches between the upper and lower side cavities reduce wavemaking drag.

184. The method of claim 180 wherein the side cavities have upper and lower regions of the side cavities that are mismatched with respect to fore-and-aft area distribution for reducing wavemaking drag.

185. The method of claim 180 wherein the nosepiece or the one or more side steps are attachable to the hull.

186. The method of claim 180, further providing at least one approximately-horizontal fence on each side of the hull between the water surface and the hull bottom.

187. The method of claim 186 wherein the side cavities are at approximately atmospheric pressure.

188. The method of claim 186 wherein upper and lower regions of the side cavities are mismatched with respect to fore-and-aft area distribution for reducing wavemaking drag.

189. The method of claim 186 wherein cavity pressures increase under each fence.

190. The method of claim 189 wherein the steps and fences provide cavity regions with a mismatch between upper and lower cavity regions with respect to fore-and-aft area distribution for reducing wavemaking drag.

191. The method of claim 189, further comprising providing a forward step that is angled down and back, providing an aft step positioned behind the forward step that is angled down and forward for forming a larger center cavity and smaller end cavities in upper regions of the side cavities and a smaller center cavity and larger end cavities in lower regions of the side cavities for providing a mismatch in cavity shapes between upper and lower cavity regions to reduce wavemaking drag.

192. The method of claim 180, further comprising providing a forward step that is angled down and back, an aft step positioned behind the forward step that is angled down and forward to form a larger center cavity and smaller end cavities in an upper region of the side cavities and a smaller center cavity and larger end cavities in a lower region of the side cavities to provide a mismatch in cavity shapes between upper and lower cavity regions and reducing wavemaking drag.

193. The method of claim 180, further comprising adding more wetted side steps in the lower region as depth increases.

194. The apparatus of claim 20, further comprising at least one step extending across the hull bottom to close a preceding bottom cavity and an air outlet either in or following an after portion of the at least one step to open a following bottom cavity aft of the step by releasing pressurized air from the air outlet, wherein one or more of the following are attachable and removable from the hull: bow nosepiece, bottom nosepiece, one or more side steps, and one or more bottom steps.

195. The apparatus of claim 5, further comprising recycling the air and releasing the air behind the bottom nosepiece or at least one bottom step.

196. The method of claim 115, further comprising providing grooves or ridges attached to the hull that start inside at least one side cavity upstream of a design cavity closure location, and end either near or behind the design cavity closure location of the at least one side cavity, and are approximately aligned with the water flow along the local cavity wall, for saving energy at cavity closure by reducing forward splash at cavity closure with the grooves or ridges.

197. The method of claim 116, further comprising providing grooves or ridges attached to the hull that start inside the at least one closed side cavity or the at least one closed bottom cavity upstream of a design cavity closure location, and end either near or behind the design cavity closure location of the at least one closed side cavity or the at least one closed bottom cavity, and are approximately aligned with the water flow along the local cavity wall, for saving energy at cavity closure by the grooves or ridges reducing forward splash at cavity closure.

198. Low drag hull method, comprising providing a waterborne vessel having at least one vessel-supporting hull, providing a hull bottom on the hull, providing at least one closed cavity on at least one hull side or the hull bottom, and further providing grooves or ridges attached to the hull that start inside the at least one closed cavity upstream of a design cavity closure location, and end either near or behind the design cavity closure location of the at least one closed cavity, and are approximately aligned with the water flow along the local cavity wall, for saving energy at cavity closure by the grooves or ridges reducing forward splash at cavity closure.

199. The low drag hull method of claim 198 wherein at least some of the grooves or ridges are provided by attaching a film that is attachable to the hull.

200. The method of claim 115 wherein the hull is a main hull of the vessel, further comprising providing at least one side hull attached to the main hull.

201. The method of claim 200 wherein the vessel is a trimaran, further comprising providing a side hull attached to each side of the main hull, and further comprising providing at least one a hydrofoil attached to at least one side hull or to the main hull.

202. The method of claim 200 further comprises providing air cavities on at least one side of the at least one side hull.

203. The method of claim 202 wherein the vessel is a trimaran, and wherein the providing a side hull further comprises providing at least one cavity attached to each side of the main hull.

204. The apparatus of claim 2 wherein the wetted tailpiece is controllable.

205. The method of claim 130 wherein the side tailpiece is controllable.

206. Low drag hull apparatus, comprising a waterborne vessel having at least one vessel-supporting hull comprising at least one surface-piercing upper hull and at least one lower hull attached to the bottom of the at least one upper hull, wherein the length of the at least one upper hull may range from a strut-like length to a length that approximates the length of the lower hull, and further comprising at least one upper cavity on an upper side of the at least one lower hull, at least one lower cavity on a lower side of the lower hull, a pressurized air source that supplies air to at least one of the lower hull cavities at a pressure greater than atmospheric pressure, a lower hull nosepiece near the bow of the lower hull that is swept back along opposite sides of the lower hull to open one or more upper or lower cavities on the lower hull and to separate a significant part of the lower cavities from the upper cavities, and a wetted tail region or tailpiece near the tail of the lower hull to close one or more upper or lower cavities.

207. Submerged hull apparatus comprising a bow and a stern, a hull beam and a hull height, a wetted nosepiece extending rearward from the bow, a wetted tailpiece extending sideward from the stern, at least one upper and one lower gas cavity between the nosepiece and the tailpiece and respectively above and below the hull, wherein the hull beam is greater than the hull height, wherein the pressure in the upper cavities are lower than the pressure in the lower cavities, wherein the wetted nosepiece and the wetted tailpiece separate the upper and lower gas cavities, and further comprising wetted regions or fences as needed for assisting the wetted nosepieces and tailpieces in separating the upper and lower cavities.

208. A submerged hull operating method comprising providing a hull having a bow, a stern, a beam, and a height, wherein the hull beam is greater than the hull height, providing a nosepiece at the bow that extends rearward from the bow on each side of the hull and a tailpiece that extends sideward from the stern, providing one or more upper and lower gas cavities between the nosepiece and the tailpiece and respectively above and below the hull, providing a at least one pressurized gas source in the hull and conduits from the at least one gas source to the cavities, and supplying the upper cavities with gas at a first pressure and supplying the lower cavities with gas at a second and higher pressure and maintaining a pressure differential between the upper and lower cavities.

209. A method of water supported vessel operation comprising providing a waterborne vessel, providing at least one vessel-supporting hull, providing at least one closed cavity, or a partially-closed cavity, having a cavity thickness on the side or the bottom of the hull, providing a wetted tailpiece on the hull side or the hull bottom, wherein the cavity thickness is designed to vary somewhat, either way, from a nosepiece step thickness to zero cavity thickness at a wetted tailpiece or a wetted tail region, wherein the cavities taper to zero thickness at the wetted tailpieces with either low or minimum cavity contact angles in order to minimize cavity drag at cavity closure.

210. The method of claim 180 wherein the side steps are provided either outward formed on the hull sides or inward formed in the sides, and wherein the side steps in side view are provided angled to the vertical along the hull.

211. The method of claim 115, further providing a bottom on the hull wherein lift on the bottom of the hull is approximately equal to displacement of the cavities and hull portions that lie above the bottom of the hull and ahead of a stern of the hull.

212. The method of claim 151 wherein lift on the bottom of the hull is approximately equal to the displacement of the cavities and hull portions that lie above the bottom of the hull and ahead of a stern of the hull.

213. The method of claim 115 wherein the providing the nosepiece further comprises providing extendable and retractable elements on opposite sides of the nosepiece, and wherein the amount of extension or retraction may vary along the nosepiece length.

214. The method of claim 151 wherein the providing the side or bottom nosepieces further comprises providing extendable and retractable elements on opposite sides of the nosepiece, and wherein the amount of extension or retraction may vary along the nosepiece length.

215. The method of claim 115 wherein the nosepiece may be swept either way from vertical in one or more different kinds of cross sectional shapes that change in shape from the top to the bottom of the nosepiece, and wherein the shapes have surface changes in a rearward direction for causing water flow to separate from the nosepiece on opposite sides, and wherein the surface changes are obtuse angles, increased convex curvatures, steps and notches, and wherein the nosepiece is a wedge shape with flat sides, convex sides or concave sides, or a flat transverse plate.

216. The method of claim 129 wherein the side and bottom nosepieces may comprise one or more of many different kinds of cross sectional shapes that change in shape along the nosepiece, wherein the shapes have surface changes in a rearward direction for causing the water flow to separate from the nosepiece on one or both sides, and wherein the surface changes on at least one side are obtuse angles, increased convex curvatures, steps and notches, and wherein the nosepiece is an angled plate with flat sides, convex sides or concave sides, or a flat or curved plate.

217. The method of claim 215 wherein a thickness of at least a portion of the nosepiece is increased under off design conditions to form a larger cavity.

218. The method of claim 216 wherein a thickness of at least a portion of the nosepiece is increased under off design conditions to form a larger cavity.

219. The method of claim 128, further comprising providing an air injector on or behind nosepiece portions that lie below the one or more fences for flowing air into the cavities.

220. The method of claim 118, further comprising providing an air injector on or behind the at least one bottom step for flowing air into the bottom cavity.

221. The method of claim 128, further comprising providing an air intake for assisting in closing the at least one side cavity or for recycling the air to conserve power.

222. The method of claim 220, further comprising providing an air intake on or ahead of the at least one bottom step for assisting in closing a previous cavity or for recycling the air to conserve power.

223. A method of water supported vessel operation comprising providing a waterborne vessel, providing at least one vessel-supporting, low drag planing hull that has at least one closed cavity on its planing surface to reduce drag, providing one or more inwardly or outwardly extending fences whose inner ends are positioned below and approximately parallel to a high speed waterline on each side of the planing hull when the planing hull is planing, supplying pressurized air to form a pressurized gas cavity on each side of the hull below each fence, and further providing wetted regions on the hull to close each cavity.

224. A waterborne vessel comprising a low drag planing hull that has at least one closed cavity on its planing surface to reduce drag, one or more inwardly or outwardly extending fences positioned below a high speed waterline on each side of the hull, the inner ends of the fences lying approximately parallel to a high speed waterline when the hull is planing, supplying pressurized air below each fence to form a pressurized gas cavity on each side of the hull below each fence, and further comprising wetted regions on the hull to close each cavity.

225. Low drag hull apparatus, comprising a waterborne vessel having at least one vessel-supporting upper hull, a wetted nosepiece on the upper hull, side cavities on the opposite sides of the upper hull for opening at the wetted nosepiece and displacing water away from the opposite sides of the upper hull, and further comprising a lower hull attached to the upper hull below the side cavities that provides the majority of displacement or remains submerged at rest, has non-circular cross sections, and wherein the beam of the lower hull is significantly greater than its height.

226. The apparatus of claim 225, further comprising a wetted lower-nosepiece on the lower hull for opening a lower cavity on the lower hull, and a wetted lower tailpiece on the lower hull for closing the lower cavity on the lower hull.

227. The apparatus of claim 225, further comprising a wetted upper nosepiece on the lower hull for opening an upper cavity on the lower hull, and a wetted upper tailpiece on the lower hull for closing the upper cavity on the lower hull.

228. The apparatus of claim 225, wherein the lower hull has a nose and a tail at opposite longitudinal ends, at least one lower cavity on the lower hull and at least one upper cavity on the lower hull, and further comprising a wetted lower hull nosepiece extending rearward from the nose of the lower hull, and a wetted lower hull tailpiece extending forward from the tail of the lower hull, wherein the lower hull nosepiece opens at least one lower cavity and at least one upper cavity on the lower hull, the lower hull tailpiece closes at least one lower cavity and at least one upper cavity on the lower hull, and further comprising either wetted regions, or fences extending outward from the lower hull, for assisting the lower hull nosepiece and lower hull tailpiece as needed in separating the lower and upper bottom cavities.

229. The apparatus of claim 180, wherein the steps begin at or near the bottom of each hull side and extend upward without reaching the water surface.

230. The apparatus of claim 229, including ducting means to supply air to cavities formed behind the steps.

231. The apparatus of claim 206, wherein a pressure in the upper cavity is approximately atmospheric.

232. The apparatus of claim 206 wherein the beam of the lower hull significantly exceeds its height, wherein the lower hull in plan view is shaped somewhat like a diamond, triangle, delta, ellipse, oval, closed series of straight and curved lines, or some combination of these shapes, or wherein a tail region of the lower hull deviates somewhat in plan view from these planform shapes, and wherein a lift on the lower hull is approximately the same or greater than the displacement of the upper and lower hulls and their associated cavities.

233. The apparatus of claim 206 wherein the one or more lower cavities are open, and the one or more upper cavities are closed.

234. The apparatus of claim 206 wherein the one or more lower cavities are closed, and wherein the one or more upper cavities are open.

235. The apparatus of claim 206 further comprising a wetted nosepiece on the upper hull, one or more side cavities on the opposite sides of the upper hull for opening at the wetted nosepiece and displacing water away from the opposite sides of the upper hull, and wherein the side cavities are at approximately atmospheric pressure.

236. The apparatus of claim 232 wherein the one or more upper cavities are closed and have pressures greater than atmospheric pressure, and the one or more lower cavities are closed and have pressures that are greater than the upper cavity pressures and less than the depth pressure outside of the lower cavities.

237. The apparatus of claim 235, further comprising underlying steps positioned on surfaces of the upper hull, or on surfaces of the upper side or lower side of the lower hull, that underlie air cavities that form at a specific operating condition, wherein the underlying steps become wetted and form additional cavities at certain speeds and depths that are different from those at the operating condition.

238. The vessel of claim 206 wherein the lower hull cavities form at an operating speed and at an operating lower-hull-centerline depth, wherein the apparatus is controlled to operate at some other depth and some other speed wherein the other depth is proportional to the operating depth multiplied by the square root of the ratio of the other speed to the operating speed.

239. The apparatus of claim 206 further comprising a propulsion system, wherein at least one hydrofoil, stabilizing fin, rudder, or canard fin is attached to the lower hull or to the upper hull, and wherein one or more of these hydrofoils, rudders or fins is controllable to control vessel attitude or to maneuver the vessel.

240. The apparatus of claim 206 wherein at least one hull comprises one or more upper and lower hulls that, together with their cavities, are mismatched in cross sectional area to reduce hull wavemaking drag.

241. The apparatus of claim 240 comprising two upper hulls and one lower hull, wherein the center of the displacement of the upper hulls lies above a center region of the lower hull displacement, and wherein the resulting mismatch in cross-sectional areas reduces the wavemaking drag on the hull.

242. The apparatus of claim 240 comprising a single upper hull and either a tandem lower hull or two lower hulls, wherein the center of displacement of the upper hull lies above a center region between the lower hull centers, and wherein the resulting mismatch in cross-sectional areas reduces the wavemaking drag on the hull.

243. The apparatus of claim 235, further comprising one or more wetted steps or fences positioned along opposite sides of the upper and lower hulls to open a variety of cavities to further reduce wetted area and reduce frictional drag on the hull or to provide a displacement distribution of the hull and its associated cavities to reduce hull wavemaking drag.

244. Low drag hull apparatus, comprising a waterborne vessel having at least one vessel-supporting hull having opposite hull sides, a stern, a wetted bow nosepiece on the hull, an upper hull region and a lower hull region on the hull, a wetted tail region near a stern end of the lower hull region, and one or more vertically-extending spaced steps on each side of the hull, wherein more steps are positioned in the lower hull region than in the upper hull region, wherein at least one side cavity opens on each side at the wetted nosepiece for displacing water from a side portion of the hull adjacent the cavity for reducing drag on the hull, wherein additional side cavities open behind the steps, wherein the hull sides in the upper hull region near the stern are covered by open cavities, and wherein side cavities in the lower hull region near the stern are closed by the wetted tail region.

245. The apparatus of claim 2, wherein a transverse cross section of at least part of the at least one hull resembles an hour glass shape that may have unequal widths at the upper and lower ends.

246. The apparatus of claim 244, wherein a transverse cross section of the at least one hull resembles an hour glass shape with the upper portion at least partially cut off.

247. The vessel of claim 46, wherein the side regions of the wetted bottom nosepiece are swept back, and the side regions of the wetted bottom region are swept forward to divide either most or all of the bottom cavities from the side cavities.

248. The vessel of claim 46, wherein all side cavities are closed.

249. A low drag hull comprising: at least one surface-piercing, vessel-supporting hull, at least one pressurized air source, at least one lower region on the at least one hull, a lower air cavity covering the surface of the at least one lower region, a wetted lower nosepiece or a wetted lower step to open one or more lower cavities in the at least one lower region for displacing water from the hull adjacent each cavity for reducing drag on the hull, wherein the lower nosepiece or the lower step is swept back along at least one side of the one or more lower cavities, further comprising a wetted lower tail region on the hull to close the one or more lower cavities, wherein each lower cavity is filled with air at greater than atmospheric pressure that is delivered from the at least one pressurized air source, wherein the pressure in each lower cavity is less than the outside depth pressure, and wherein the lower surface of each lower cavity is convex in a longitudinal cross section and in at least a portion of a transverse cross section.

250. The apparatus of claim 249, wherein the one or more lower regions comprise a bottom region on the hull, further comprising a side surface on at least one side of the at least one hull that extends upward from the bottom region that is covered by at least one side cavity filled with air at a pressure that is less than the pressure in adjacent cavities in the bottom region, further comprising at least one wetted region, fence, nosepiece or tailpiece to help separate the at least one side cavity from adjacent cavities in the bottom region.

251. The apparatus of claim 249, wherein a transverse cross section of the at least one hull resembles an hourglass shape.

252. Low drag hull method, comprising providing a waterborne vessel having at least one vessel-supporting hull having opposite sides, providing a wetted nosepiece on the hull, providing side cavities on the opposite sides of the hull, opening the side cavities at the wetted nosepiece, providing wetted side steps on the opposite sides behind the nosepiece, opening additional side cavities at the wetted side steps, and displacing water from each side of the hull adjacent each cavity, wherein the side cavities have upper and lower regions wherein the side cavities in the upper regions are mismatched from the side cavities in the lower region with respect to fore-and-aft area distribution for reducing wavemaking drag.

253. The method of claim 191, wherein cavity pressures increase under each fence.

254. Low drag hull apparatus comprising a waterborne vessel having at least one vessel-supporting hull, a hull bottom on the hull, one or more bottom cavities on the hull bottom, wherein the pressure in the bottom cavities is less than depth pressure, and wherein the surfaces of the one or more bottom cavities in a longitudinal plane are convex, further comprising a wetted swept-back bottom nosepiece having a vee-like shape in bottom view and whose leading edges lie near sides of the hull bottom to form at least one bottom cavity to reduce drag, wherein bottom steps may be used to initiate one or more additional bottom cavities or to close one or more bottom cavities, further comprising a wetted bottom tail region on the bottom of the hull to close one or more bottom cavities, wherein the wetted bottom tail region is swept forward near each side of the hull bottom, and further comprising wetted regions or fences positioned between the bottom nosepiece and the wetted bottom tail region to limit the bottom cavities to the bottom of the hull without using downward-extending side keels.

255. The method of claim 148, further providing a stern on the hull, providing a bottom on the hull, closing side cavities in a region at or near the bottom of the hull, providing a swept-back wetted bottom nosepiece at the bottom of the hull, opening a bottom cavity at the wetted bottom nosepiece, extending the bottom cavity rearward beyond the stern of the hull, and providing wetted regions or fences as needed to separate the open bottom cavity from adjacent side cavities.

256. The apparatus of claim 71, further comprising one or more closed bottom cavities on the bottom of the hull.

257. The apparatus of claim 92 wherein the side cavities are open, and further comprising one or more closed bottom cavities on the bottom of the hull.

258. The apparatus of claim 161, further providing a wetted lower hull region closing a cavity on the upper side of the lower hull, providing an open cavity on the lower side of the lower hull, and providing fences or wetted regions as needed for separating the cavities on the upper and lower sides of the lower hull.

259. The apparatus of claim 206 wherein the at least one vessel-supporting hull is a catamaran vessel comprising two parallel surface-piercing upper hulls, each with an attached lower hull.

260. The apparatus of claim 254, wherein a transverse cross section of the at least one hull resembles an hourglass shape that has equal or unequal top and bottom widths.

261. Submarine method, comprising providing a submerged hull having upper and lower surfaces, providing at least one cavity on each surface, providing a wetted nosepiece on the hull, opening at least one upper cavity and at least one lower cavity at the wetted nosepiece, displacing water from each side of the hull adjacent each cavity and reducing drag, further providing a wetted tailpiece for closing upper and lower cavities, wherein the upper cavities are filled with gas at a pressure less than depth pressure, and the lower cavities are filled with gas at a pressure greater than the upper cavities, and further providing fences or wetted regions to assist the wetted nosepiece and wetted tailpiece in separating the upper and lower cavities, and wherein the width of the hull is significantly greater than its height.

262. The method of claim 146, further providing a wetted tailpiece for closing the side cavities, wherein the side cavities are one or more upper and lower cavities that close on the tailpiece, and the hull is a submarine vessel wherein the upper cavities are filled with gas at a pressure less than depth pressure, and the lower cavities are filled with gas at a pressure greater than the upper cavities, and further providing fences or wetted regions to assist the wetted nosepiece and wetted tailpiece in separating the upper and lower cavities, and wherein the hull beam is greater than the hull height.

263. Submarine method, comprising providing a submerged hull having upper and lower surfaces, providing at least one cavity on each surface, providing a wetted nosepiece on the hull, opening at least one upper cavity and at least one lower cavity at the wetted nosepiece, displacing water from each side of the hull adjacent each cavity and reducing drag, further providing a wetted tailpiece for closing at least one upper or lower cavity, wherein the upper cavities are filled with gas at a pressure less than depth pressure, and the lower cavities are filled with gas at a pressure greater than the upper cavities, and further providing fences or wetted regions to assist the wetted nosepiece and wetted tailpiece in separating the upper and lower cavities as needed, and wherein the width of the hull is significantly greater than its height.

264. The apparatus of claim 254, further comprising one or more open or closed side cavities on the sides of the at least one hull.

265. The apparatus of claim 264 wherein at least one of the side cavities is open.

266. The method of claim 223, further providing a nosepiece attached to a keel portion lying below each fence, or providing one or more vertically extending steps attached to the planing hull on each side behind a keel portion, and supplying pressurized air behind each nosepiece or step to form one or more pressurized gas cavities on each side of the hull.

267. The vessel of claim 224, further comprising a nosepiece attached to a keel portion lying below each fence, or comprising one or more vertically extending steps attached to the planing hull on each side behind a keel portion, and supplying pressurized air behind each nosepiece or step to form one or more pressurized gas cavities on each side of the hull.

268. The apparatus of claim 244, further comprising air injectors on or behind at least a part of the nosepiece or on or behind at least a part of the steps for flowing air into the cavities.

269. The apparatus of claim 244, further comprising side hull air intakes on or near the tail region or on or near the steps to help close side cavities.

270. The apparatus of claim 249, further comprising a stabilizing fin having a vertically-projected area extending from a side of the hull.

271. The apparatus of claim 270, further comprising controls mounted on or near the hull, the bow nosepiece, or the fin, for controlling the hull.

272. The apparatus of claim 271, further comprising control surfaces on the fin.

273. The apparatus of claim 270, further comprising closed fin cavities on opposite surfaces of the fin.

274. The apparatus of claim 249, further comprising parallel hulls, that may be low drag hulls, connected to the hull.

275. The apparatus of claim 249, further comprising a side surface on each side of the one or more hulls, comprising one or more steps along a side surface for starting one or more side cavities along the hull.

276. The apparatus of claim 249, further comprising a bow nosepiece at the bow of the at least one hull, and comprising at least one side cavity that is formed at or behind the bow nosepiece, and wherein at least a portion of the bow nosepiece is either flat in a cross-section parallel to the water flow, or is wedge shaped and has a streamline surface discontinuity at its aft end selected from the group consisting of obtuse angles, change in surface curvature, concave, convex, flat, notches, and combination step and notch.

277. The apparatus of claim 244, wherein at least one of the side steps is an underlying side step that lies under design cavities that form at design speed, and wherein a new side cavity is formed behind at least one of the underlying side steps under an off-design condition.

278. The apparatus of claim 252, further comprising at least one bottom air cavity on the hull bottom, a bottom nosepiece on the hull bottom for opening the bottom cavity, means for supplying pressurized air into the bottom cavity behind or through the nosepiece, a wetted bottom tail region on the hull bottom for closing a bottom cavity, a wetted region or a fence between the lower side cavities and the bottom cavities to separate these cavities, wherein said wetted region or a fence includes the bottom nosepiece and the wetted bottom tail region.

279. The apparatus of claim 227, further comprising wetted side regions or side fences extending outward from the opposite sides of the upper hull for assisting as needed in separating the side cavities from the upper bottom cavity.

280. The apparatus of claim 225, wherein the lower hull has any of a variety of planform shapes including those resembling a streamlined shape with either a rounded or a wedge-shared or a flat nose, a diamond shape with optional wetted outer tips or with wetted parallel tips, a vee-shaped nose with an included angle lying between 10 degrees and 180 degrees followed by one or more straight sides that may be angled either way, a streamlined fore body followed by a wetted vee-shaped tailpiece, a triangular or delta shape, or a streamlined fore body that flares outward near the stern and ending with a wetted transverse or vee-shaped tailpiece.

281. The apparatus of claim 227, wherein the upper bottom cavity is at atmospheric pressure, and merges with the side cavities.

282. The apparatus of claim 279, wherein the upper bottom cavity is at greater than atmospheric pressure.

283. The apparatus of claim 225, wherein the lower hull has at least one control flap attached to a trailing edge of the lower hull.

284. The apparatus of claim 225, wherein the lower hull terminates with a wetted tailpiece having an overall span that approximately equals or exceeds a preceding lower hull span and helps provide vessel pitch stability, and wherein the lower hull has none or one or more upper cavities and none or one or more lower cavities.

285. The apparatus of claim 284, wherein the lower hull has a control flap attached to its trailing edge for controlling one or more of vessel heave, pitch and roll.

286. The apparatus of claim 225, wherein the lower hull provides dynamic lift.

287. The apparatus of claim 225, wherein the vessel is a catamaran, and wherein at least a portion of the upper hull that lies above each lower hull is divided into a forward hull and an aft hull.

288. The method of claim 261, wherein the hull lies inside the upper and lower cavities, and further providing one or more pressure hulls that lie inside the outer surface of the hull.

289. The method of claim 288 wherein the hull encloses a center pressure hull and two parallel side pressure hulls.

290. The method of claim 261, wherein the nosepiece is retractable for operating the submarine with the hull fully wetted.

291. The method of claim 261, further providing sensors placed inside or near the nosepiece or tailpiece.

292. The method of claim 261, wherein flaps are attached to the tailpiece for controlling the submarine in depth, pitch angle and roll angle.

293. The method of claim 261, wherein the cavity shapes and the underlying hull shapes are developed for a given design speed and depth.

294. The method of claim 293, wherein the submarine operates about equally well at speeds and depths other than at the design speed and depth as long as the speed is approximately in proportion to the square root of submarine depth.

295. The method of claim 291, wherein the sensors are sonar arrays.

296. The apparatus of claim 225, wherein the upper and lower hulls form either each hull of a catamaran or the main hull of a multi-hulled vessel, and further comprising one or more hydrofoils attached to the lower hull for supporting at least a part of a weight of the vessel.

297. The apparatus of claim 296, further comprising side hulls of a trimaran that have side cavities to reduce drag.

298. The apparatus of claim 296, wherein the at least one hydrofoil is fully wetted or has at least one cavity on one side, and is unswept, swept back or forward.

299. The apparatus of claim 296 further comprising at least one stabilizing fin attached to at least one hull.

300. The apparatus of claim 299, wherein at least one hull includes canard fins.

301. The apparatus of claim 296, wherein at least one hull is above water at design speed, and the vessel is controlled in one or more of heave, pitch and roll.

302. The apparatus of claim 299, wherein all hulls, fins and hydrofoils have cavities on each side for reducing drag.

303. The apparatus of claim 297, further comprising fins attached to at least one hull or attached between any two hulls to increase pitch and yaw stability.

304. The apparatus of claim 297, wherein the side hulls are positioned toward a forward end of the vessel to support a forward portion of hull weight and help provide stability in heave, pitch and roll.

305. The apparatus of claim 244, wherein a thickness of at least a portion of the nosepiece or of the at least one side step is increased under off design conditions for forming a larger cavity.

306. The method of claim 263, wherein the at least one upper or lower cavity is open.

307. The apparatus of claim 264, further comprising a wetted stern tailpiece, wherein at least a portion of the side cavities close at the wetted stern tailpiece.

* * * * *